(12) United States Patent
Martin, Jr. et al.

(10) Patent No.: US 12,456,094 B2
(45) Date of Patent: Oct. 28, 2025

(54) DELIVERY SYSTEM

(71) Applicant: Rehrig Pacific Company, Los Angeles, CA (US)

(72) Inventors: Robert Lee Martin, Jr., Pleasant Prairie, WI (US); Kalpana Mahesh, Frisco, TX (US); Rachel Herstad, Long Beach, CA (US); Georgey John, Lantana, TX (US); Hari Durga Tatineni, Irving, TX (US); Rahul Agarwal, Plano, TX (US); Jason Crawford Miller, Bedford, TX (US); Ravi Raghunathan, Irvine, CA (US); Joseph Melendez, Tustin, CA (US); Deanna Petrochilos, Carlsbad, CA (US); Charles Burden, Las Vegas, NV (US)

(73) Assignee: Rehrig Pacific Company, Los Angeles, CA (US)

( * ) Notice: Subject to any disclaimer, the term of this patent is extended or adjusted under 35 U.S.C. 154(b) by 7 days.

(21) Appl. No.: 17/729,475

(22) Filed: Apr. 26, 2022

(65) Prior Publication Data
US 2022/0250845 A1    Aug. 11, 2022

Related U.S. Application Data

(63) Continuation of application No. 17/369,223, filed on Jul. 7, 2021, now Pat. No. 11,383,930, which is a (Continued)

(51) Int. Cl.
*G06Q 10/087*    (2023.01)
*B65B 11/04*    (2006.01)
(Continued)

(52) U.S. Cl.
CPC ......... *G06Q 10/087* (2013.01); *B65B 11/045* (2013.01); *B65G 1/1378* (2013.01);
(Continued)

(58) Field of Classification Search
CPC ............ G06Q 10/087; G06Q 10/0833; G06Q 10/0875; G06Q 50/28; B65B 11/045;
(Continued)

(56) References Cited

U.S. PATENT DOCUMENTS

| 1,086,727 A | 2/1914 | Palmer |
| 5,326,939 A | 7/1994 | Schafer |

(Continued)

FOREIGN PATENT DOCUMENTS

| CN | 202729702 U | 2/2013 |
| CN | 107516220 A | 12/2017 |

(Continued)

OTHER PUBLICATIONS

Office Action for U.S. Appl. No. 17/508,021, dated Apr. 26, 2022.
(Continued)

*Primary Examiner* — Thomas Randazzo
(74) *Attorney, Agent, or Firm* — Carlson, Gaskey & Olds, P.C.

(57) ABSTRACT

A delivery system generates a pick sheet containing a plurality of SKUs based upon an order. A loaded pallet is imaged to identify the SKUs on the loaded pallet, which are compared to the order prior to the loaded pallet leaving the distribution center. The loaded pallet may be imaged while being wrapped with stretch wrap. At the point of delivery, the loaded pallet may be imaged again and analyzed to compare with the pick sheet.

17 Claims, 28 Drawing Sheets

Related U.S. Application Data continuation of application No. 17/204,088, filed on Mar. 17, 2021, now Pat. No. 11,087,160, which is a continuation of application No. 16/774,949, filed on Jan. 28, 2020, now Pat. No. 11,046,519.

(60) Provisional application No. 62/896,353, filed on Sep. 5, 2019, provisional application No. 62/810,314, filed on Feb. 25, 2019.

(51) Int. Cl.

| | | |
|---|---|---|
| B65G 1/137 | (2006.01) | |
| B65G 57/03 | (2006.01) | |
| B65G 57/20 | (2006.01) | |
| B65G 57/24 | (2006.01) | |
| G06K 7/10 | (2006.01) | |
| G06K 7/14 | (2006.01) | |
| G06N 20/00 | (2019.01) | |
| G06Q 10/0833 | (2023.01) | |
| G06Q 10/0875 | (2023.01) | |
| G06Q 50/28 | (2012.01) | |
| G06T 7/00 | (2017.01) | |
| G06V 10/147 | (2022.01) | |
| G06V 10/75 | (2022.01) | |
| G06V 20/56 | (2022.01) | |
| G01C 21/34 | (2006.01) | |

(52) U.S. Cl.
CPC ............ *B65G 57/03* (2013.01); *B65G 57/20* (2013.01); *B65G 57/24* (2013.01); *G06K 7/10237* (2013.01); *G06K 7/1447* (2013.01); *G06N 20/00* (2019.01); *G06Q 10/0833* (2013.01); *G06Q 10/0875* (2013.01); *G06Q 50/28* (2013.01); *G06T 7/0008* (2013.01); *G06T 7/001* (2013.01); *G06V 10/147* (2022.01); *G06V 10/751* (2022.01); *G06V 20/56* (2022.01); *G01C 21/34* (2013.01)

(58) Field of Classification Search
CPC ...... B65G 1/1378; B65G 57/03; B65G 57/20; B65G 57/24; G06K 7/10237; G06K 7/1447; G06N 20/00; G06T 7/0008; G06T 7/001; G06T 2207/30128; G06V 10/147; G06V 10/751; G06V 20/56; G01C 21/34; G01C 21/343

See application file for complete search history.

(56) References Cited

U.S. PATENT DOCUMENTS

| | | |
|---|---|---|
| 5,491,483 A | 2/1996 | D'Hont |
| 5,565,846 A | 10/1996 | Geiszler et al. |
| 5,730,252 A | 3/1998 | Herbinet |
| 6,026,378 A | 2/2000 | Onozaki |
| 6,191,691 B1 | 2/2001 | Serrault |
| 6,264,106 B1 | 7/2001 | Bridgelall |
| 6,302,461 B1 | 10/2001 | Debras et al. |
| 6,626,634 B2 | 9/2003 | Hwang et al. |
| 6,669,089 B2 | 12/2003 | Cybulski et al. |
| 6,721,762 B1 | 4/2004 | Levine et al. |
| 6,856,860 B2 | 2/2005 | Stringham et al. |
| 6,918,229 B2 | 7/2005 | Lancaster, III et al. |
| 7,097,045 B2 | 8/2006 | Winkler |
| 7,511,611 B2 | 3/2009 | Sabino et al. |
| 7,548,166 B2 | 6/2009 | Roeder et al. |
| 7,557,714 B2 | 7/2009 | Roeder et al. |
| 7,602,288 B2 | 10/2009 | Broussard |
| 7,698,179 B2 | 4/2010 | Leung et al. |
| 7,739,147 B2 | 6/2010 | Branigan et al. |
| 7,765,668 B2 | 8/2010 | Townsend et al. |
| 7,772,964 B2 | 8/2010 | Tethrake et al. |
| 7,865,398 B2 | 1/2011 | Schon |
| 7,877,164 B2 | 1/2011 | Grunbach et al. |
| 7,882,366 B2 | 2/2011 | Sen et al. |
| 7,957,833 B2 | 6/2011 | Beucher et al. |
| 8,032,249 B1 | 10/2011 | Shakes et al. |
| 8,073,562 B2 | 12/2011 | Danelski |
| 8,260,647 B2 | 9/2012 | Scott et al. |
| 8,301,294 B1 | 10/2012 | Shakes et al. |
| 8,433,437 B1 | 4/2013 | Shakes et al. |
| 8,494,673 B2 | 7/2013 | Miranda et al. |
| 8,718,372 B2 | 5/2014 | Holeva et al. |
| 8,739,502 B2 | 6/2014 | Lancaster, III |
| 8,839,132 B2 | 9/2014 | Reichert |
| 8,849,007 B2 | 9/2014 | Holeva et al. |
| 8,885,948 B2 | 11/2014 | Holeva et al. |
| 8,892,241 B2 | 11/2014 | Weiss |
| 8,908,995 B2 | 12/2014 | Benos et al. |
| 8,918,976 B2 | 12/2014 | Townsend et al. |
| 8,934,672 B2 | 1/2015 | Holeva et al. |
| 8,938,126 B2 | 1/2015 | Holeva et al. |
| 8,965,559 B2 | 2/2015 | Pankratov et al. |
| 8,977,032 B2 | 3/2015 | Holeva et al. |
| 8,978,984 B2 | 3/2015 | Hennick et al. |
| 8,995,743 B2 | 3/2015 | Holeva et al. |
| 9,007,178 B2 | 4/2015 | Nikitin et al. |
| 9,025,827 B2 | 5/2015 | Holeva et al. |
| 9,025,886 B2 | 5/2015 | Holeva et al. |
| 9,082,195 B2 | 7/2015 | Holeva et al. |
| 9,087,384 B2 | 7/2015 | Holeva et al. |
| 9,171,278 B1 | 10/2015 | Kong et al. |
| 9,224,120 B2 | 12/2015 | Grabiner et al. |
| 9,373,098 B2 | 6/2016 | Nashif et al. |
| 9,488,466 B2 | 11/2016 | Hanson |
| 9,488,986 B1 | 11/2016 | Solanki |
| 9,489,655 B1 | 11/2016 | Lecky |
| 9,503,704 B2 | 11/2016 | Ando |
| 9,505,554 B1 | 11/2016 | Kong et al. |
| 9,663,338 B1 | 5/2017 | James et al. |
| 9,725,195 B2 | 8/2017 | Lancaster, III et al. |
| 9,727,840 B2 | 8/2017 | Bernhardt |
| 9,734,367 B1 | 8/2017 | Lecky et al. |
| 9,811,632 B2 | 11/2017 | Grabiner et al. |
| 9,821,344 B2 | 11/2017 | Zsigmond et al. |
| 9,826,213 B1 | 11/2017 | Russell et al. |
| 9,830,485 B1 | 11/2017 | Lecky |
| 9,944,417 B2 | 4/2018 | Lemieux et al. |
| 9,969,572 B2 | 5/2018 | Pankratov et al. |
| 9,984,339 B2 | 5/2018 | Hance et al. |
| 9,990,535 B2 | 6/2018 | Phillips et al. |
| 10,005,581 B2 | 6/2018 | Lancaster, III et al. |
| 10,026,044 B1 | 7/2018 | Wurman et al. |
| 10,040,631 B2 | 8/2018 | Shakes et al. |
| 10,042,079 B2 | 8/2018 | Patnaik |
| 10,055,805 B2 | 8/2018 | Satou |
| 10,071,856 B2 | 9/2018 | Hance et al. |
| 10,089,509 B2 | 10/2018 | Nachtrieb |
| 10,133,990 B2 | 11/2018 | Hance et al. |
| 10,134,120 B2 | 11/2018 | Jovanovski et al. |
| 10,140,724 B2 | 11/2018 | Benos et al. |
| 10,155,199 B2 | 12/2018 | Sakai et al. |
| 10,198,805 B2 | 2/2019 | Halata |
| 10,217,075 B1 | 2/2019 | Ward et al. |
| 10,220,970 B2 | 3/2019 | Lemieux et al. |
| 10,227,152 B2 | 3/2019 | Lancaster, III et al. |
| 10,229,487 B2 | 3/2019 | Goyal et al. |
| 10,265,871 B2 | 4/2019 | Hance et al. |
| 10,266,349 B2 | 4/2019 | Pankratov et al. |
| 10,328,578 B2 | 6/2019 | Holz |
| 10,346,987 B1 | 7/2019 | Landman |
| 10,347,095 B2 | 7/2019 | Mattingly et al. |
| 10,363,664 B2 | 7/2019 | Yoshii |
| 10,369,701 B1 | 8/2019 | Diankov et al. |
| 10,402,956 B2 | 9/2019 | Jovanovski et al. |
| 10,427,895 B2 | 10/2019 | Redman |
| 10,430,969 B2 | 10/2019 | Kopelke et al. |
| 10,440,513 B2 | 10/2019 | Todeschini et al. |
| 10,442,640 B2 | 10/2019 | Pankratov et al. |
| 10,456,915 B1 | 10/2019 | Diankov |

(56) References Cited

U.S. PATENT DOCUMENTS

| | | |
|---|---|---|
| 10,482,401 B2 | 11/2019 | Wurman et al. |
| 10,491,881 B1 | 11/2019 | Russell et al. |
| 10,504,343 B2 | 12/2019 | Mattingly et al. |
| 10,518,973 B2 | 12/2019 | Hance et al. |
| 10,535,039 B2 | 1/2020 | Jones et al. |
| 10,562,188 B1 | 2/2020 | Diankov et al. |
| 10,562,189 B1 | 2/2020 | Diankov et al. |
| 10,569,416 B1 | 2/2020 | Diankov |
| 10,569,417 B1 | 2/2020 | Diankov |
| 10,576,631 B1 | 3/2020 | Diankov |
| 10,592,842 B2 | 3/2020 | High et al. |
| 10,596,701 B1 | 3/2020 | Diankov |
| 10,607,182 B2 | 3/2020 | Shah et al. |
| 10,614,319 B2 | 4/2020 | Douglas et al. |
| 10,616,553 B1 | 4/2020 | Russell et al. |
| 10,618,172 B1 | 4/2020 | Diankov et al. |
| 10,621,457 B2 | 4/2020 | Schimmel |
| 10,627,244 B1 | 4/2020 | Lauka et al. |
| 10,628,763 B2 | 4/2020 | Hance et al. |
| 10,643,038 B1 | 5/2020 | McCalib, Jr. et al. |
| 10,643,170 B2 | 5/2020 | Lee et al. |
| 10,655,945 B2 | 5/2020 | Nanda et al. |
| 10,679,379 B1 | 6/2020 | Diankov et al. |
| 10,685,197 B2 | 6/2020 | Plummer et al. |
| 10,703,584 B2 | 7/2020 | Diankov et al. |
| 10,703,585 B2 | 7/2020 | Pankratov et al. |
| 10,706,571 B2 | 7/2020 | Sugimura et al. |
| 10,713,643 B2 | 7/2020 | Tian |
| 10,724,973 B2 | 7/2020 | Paresi |
| 10,733,565 B1 | 8/2020 | Stephens et al. |
| 10,759,599 B2 | 9/2020 | Hance et al. |
| 10,769,806 B2 | 9/2020 | Driegen et al. |
| 10,796,423 B2 | 10/2020 | Goja |
| 10,805,402 B1 | 10/2020 | Whitman et al. |
| 10,810,541 B2 | 10/2020 | Todeschini |
| 10,845,184 B2 | 11/2020 | Benos et al. |
| 10,845,499 B2 | 11/2020 | Paresi |
| 10,867,275 B1 | 12/2020 | Dholakia et al. |
| 11,046,519 B2 | 6/2021 | Martin, Jr. et al. |
| 11,068,841 B1* | 7/2021 | Lui .................... G06K 7/10376 |
| 11,087,160 B2 | 8/2021 | Martin, Jr. et al. |
| 11,111,089 B2 | 9/2021 | Redman |
| 2002/0010661 A1 | 1/2002 | Waddington et al. |
| 2002/0121521 A1 | 9/2002 | Beal et al. |
| 2004/0068443 A1 | 4/2004 | Hopson et al. |
| 2004/0069850 A1 | 4/2004 | De Wilde |
| 2004/0220694 A1 | 11/2004 | Stingel, III et al. |
| 2005/0071234 A1 | 3/2005 | Schon |
| 2005/0246056 A1 | 11/2005 | Marks et al. |
| 2006/0187041 A1 | 8/2006 | Olsen, III et al. |
| 2006/0242820 A1 | 11/2006 | Townsend et al. |
| 2006/0255949 A1* | 11/2006 | Roeder .............. G06K 7/10079<br>340/572.7 |
| 2006/0255950 A1 | 11/2006 | Roeder et al. |
| 2006/0265247 A1 | 11/2006 | Chaudhuri |
| 2006/0273180 A1 | 12/2006 | Ammond et al. |
| 2007/0017986 A1* | 1/2007 | Carrender ........ G06K 19/07749<br>340/572.7 |
| 2007/0094155 A1 | 4/2007 | Dearing |
| 2007/0126578 A1 | 6/2007 | Broussard |
| 2007/0156281 A1 | 7/2007 | Leung et al. |
| 2007/0163099 A1 | 7/2007 | Townsend et al. |
| 2007/0250383 A1 | 10/2007 | Tollinger |
| 2008/0094224 A1 | 4/2008 | Parker et al. |
| 2008/0290153 A1 | 11/2008 | Jouvin et al. |
| 2009/0021376 A1 | 1/2009 | Calvarese |
| 2009/0078702 A1 | 3/2009 | Martin, Jr. et al. |
| 2009/0112675 A1 | 4/2009 | Servais |
| 2009/0240554 A1 | 9/2009 | Oswald et al. |
| 2010/0127870 A1* | 5/2010 | Rinkes ................ B66F 9/0755<br>340/572.1 |
| 2010/0202702 A1 | 8/2010 | Benos et al. |
| 2011/0283233 A1 | 11/2011 | Martin, Jr. et al. |
| 2012/0047080 A1 | 2/2012 | Rodatos |
| 2012/0057022 A1 | 3/2012 | Nechiporenko et al. |
| 2012/0175412 A1 | 7/2012 | Grabiner et al. |
| 2012/0284122 A1 | 11/2012 | Brandis |
| 2012/0295542 A1 | 11/2012 | Telemi |
| 2012/0310788 A1 | 12/2012 | Naono |
| 2013/0035787 A1 | 2/2013 | Canter |
| 2013/0101166 A1 | 4/2013 | Holeva et al. |
| 2013/0101167 A1 | 4/2013 | Holeva et al. |
| 2013/0101173 A1 | 4/2013 | Holeva et al. |
| 2013/0101201 A1 | 4/2013 | Holeva et al. |
| 2013/0101202 A1 | 4/2013 | Holeva et al. |
| 2013/0101203 A1 | 4/2013 | Holeva et al. |
| 2013/0101204 A1 | 4/2013 | Holeva et al. |
| 2013/0101227 A1 | 4/2013 | Holeva et al. |
| 2013/0101228 A1 | 4/2013 | Holeva et al. |
| 2013/0101229 A1 | 4/2013 | Holeva et al. |
| 2013/0101230 A1 | 4/2013 | Holeva et al. |
| 2013/0104045 A1 | 4/2013 | Nickerson et al. |
| 2013/0282165 A1 | 10/2013 | Pankratov et al. |
| 2013/0332247 A1 | 12/2013 | Gu |
| 2014/0214697 A1 | 7/2014 | McSweeney |
| 2014/0258165 A1 | 9/2014 | Heil |
| 2014/0340197 A1 | 11/2014 | Flood |
| 2014/0367292 A1 | 12/2014 | Bonello et al. |
| 2014/0367463 A1 | 12/2014 | Cibor |
| 2015/0100428 A1 | 4/2015 | Parkinson, Jr. |
| 2015/0101281 A1 | 4/2015 | Kudia |
| 2015/0102100 A1 | 4/2015 | Hattrup et al. |
| 2015/0149946 A1 | 5/2015 | Benos et al. |
| 2015/0166272 A1 | 6/2015 | Pankratov et al. |
| 2015/0262247 A1 | 9/2015 | Bonello et al. |
| 2015/0325013 A1 | 11/2015 | Patnaik |
| 2016/0104274 A1 | 4/2016 | Jovanovski et al. |
| 2016/0104290 A1 | 4/2016 | Patnaik |
| 2016/0110630 A1 | 4/2016 | Heusch et al. |
| 2016/0154939 A1 | 6/2016 | Grabiner et al. |
| 2016/0275441 A1 | 9/2016 | Barber et al. |
| 2016/0371512 A1 | 12/2016 | Hattrup et al. |
| 2017/0011364 A1* | 1/2017 | Whitman ............... B65D 19/16 |
| 2017/0015005 A1 | 1/2017 | Joplin |
| 2017/0015537 A1 | 1/2017 | Bosworth, III et al. |
| 2017/0076469 A1 | 3/2017 | Sonoura et al. |
| 2017/0132773 A1 | 5/2017 | Toedtli |
| 2017/0154397 A1 | 6/2017 | Satou |
| 2017/0161673 A1 | 6/2017 | High et al. |
| 2017/0193432 A1 | 7/2017 | Bernhardt |
| 2017/0193434 A1 | 7/2017 | Shah et al. |
| 2017/0286876 A1* | 10/2017 | Tingler ............... G06Q 10/047 |
| 2017/0316253 A1 | 11/2017 | Phillips et al. |
| 2017/0323376 A1 | 11/2017 | Glaser et al. |
| 2018/0025185 A1 | 1/2018 | Hattrup et al. |
| 2018/0029797 A1 | 2/2018 | Hance et al. |
| 2018/0043547 A1 | 2/2018 | Hance et al. |
| 2018/0053145 A1 | 2/2018 | Jones et al. |
| 2018/0060630 A1 | 3/2018 | Nachtrieb |
| 2018/0060764 A1 | 3/2018 | Hance et al. |
| 2018/0089517 A1 | 3/2018 | Douglas et al. |
| 2018/0114415 A1 | 4/2018 | Mattingly et al. |
| 2018/0218247 A1 | 8/2018 | Lee et al. |
| 2018/0224569 A1 | 8/2018 | Paresi |
| 2018/0225597 A1 | 8/2018 | Hance et al. |
| 2018/0247404 A1 | 8/2018 | Goyal et al. |
| 2018/0253857 A1 | 9/2018 | Driegen et al. |
| 2018/0257879 A1 | 9/2018 | Pankratov et al. |
| 2018/0273226 A1 | 9/2018 | Lancaster, III et al. |
| 2018/0304468 A1 | 10/2018 | Holz |
| 2018/0314866 A1 | 11/2018 | Kotula |
| 2018/0314867 A1 | 11/2018 | Kotula |
| 2018/0322424 A1 | 11/2018 | Wurman et al. |
| 2018/0370046 A1 | 12/2018 | Hance et al. |
| 2018/0370727 A1 | 12/2018 | Hance et al. |
| 2019/0005668 A1 | 1/2019 | Sugimura et al. |
| 2019/0026791 A1 | 1/2019 | Rai et al. |
| 2019/0026878 A1 | 1/2019 | Jovanovski et al. |
| 2019/0034839 A1 | 1/2019 | Hance et al. |
| 2019/0034875 A1 | 1/2019 | Bryan et al. |
| 2019/0035043 A1 | 1/2019 | Jones et al. |
| 2019/0041341 A1 | 2/2019 | Paresi |
| 2019/0049234 A1 | 2/2019 | Benos et al. |
| 2019/0080207 A1 | 3/2019 | Chang et al. |

(56) References Cited

U.S. PATENT DOCUMENTS

| | | |
|---|---|---|
| 2019/0102146 A1* | 4/2019 | Swift .................. G06F 3/167 |
| 2019/0102874 A1 | 4/2019 | Goja |
| 2019/0122173 A1 | 4/2019 | Souder et al. |
| 2019/0156086 A1 | 5/2019 | Plummer et al. |
| 2019/0193956 A1 | 6/2019 | Morland et al. |
| 2019/0197561 A1 | 6/2019 | Adato et al. |
| 2019/0206059 A1 | 7/2019 | Landman |
| 2019/0220990 A1 | 7/2019 | Goja et al. |
| 2019/0248604 A1 | 8/2019 | Pankratov et al. |
| 2019/0251385 A1 | 8/2019 | Kotula |
| 2019/0279017 A1 | 9/2019 | Graham et al. |
| 2019/0295385 A1 | 9/2019 | Mattingly et al. |
| 2020/0005531 A1 | 1/2020 | Jiang |
| 2020/0039765 A1 | 2/2020 | Pankratov et al. |
| 2020/0074523 A1* | 3/2020 | Wang .................. G06N 7/01 |
| 2020/0087068 A1 | 3/2020 | Hance et al. |
| 2020/0104785 A1 | 4/2020 | Ehrman et al. |
| 2020/0105008 A1 | 4/2020 | Ehrman et al. |
| 2020/0130961 A1 | 4/2020 | Diankov et al. |
| 2020/0130962 A1 | 4/2020 | Yu et al. |
| 2020/0134828 A1 | 4/2020 | Diankov et al. |
| 2020/0134830 A1 | 4/2020 | Yu et al. |
| 2020/0238517 A1 | 7/2020 | Diankov |
| 2020/0238519 A1 | 7/2020 | Diankov et al. |
| 2020/0265494 A1 | 8/2020 | Glaser et al. |
| 2020/0273131 A1 | 8/2020 | Martin, Jr. et al. |
| 2020/0294244 A1 | 9/2020 | Diankov et al. |
| 2020/0302243 A1 | 9/2020 | Fryshman |
| 2020/0311362 A1 | 10/2020 | Plummer et al. |
| 2020/0320474 A1 | 10/2020 | Hong et al. |
| 2020/0356798 A1 | 11/2020 | Kotula |
| 2021/0125199 A1 | 4/2021 | Woodbeck et al. |
| 2021/0198042 A1 | 7/2021 | Martin, Jr. et al. |
| 2021/0276807 A1 | 9/2021 | van Schijndel et al. |
| 2021/0398045 A1* | 12/2021 | Hanebeck ........ G06Q 10/06315 |
| 2021/0403066 A1 | 12/2021 | Martin, Jr. et al. |

FOREIGN PATENT DOCUMENTS

| | | |
|---|---|---|
| DE | 431555 A1 | 11/1994 |
| DE | 19945052 A1 | 4/2001 |
| DE | 202008004595 U1 | 7/2008 |
| EP | 1477430 A1 | 11/2004 |
| EP | 1826152 A1 | 8/2007 |
| EP | 3399329 A1 | 11/2018 |
| EP | 3667356 A1 | 6/2020 |
| GB | 2252316 A | 8/1992 |
| GB | 2359729 A | 9/2001 |
| GB | 2368438 A | 5/2002 |
| GB | 2404064 A | 1/2005 |
| KR | 100911343 B1 | 8/2009 |
| KR | 20100051156 A | 5/2010 |
| TW | 201926167 A | 7/2019 |
| WO | 9529456 A1 | 11/1995 |
| WO | 9707473 A1 | 2/1997 |
| WO | 03030120 A1 | 4/2003 |
| WO | 2006096101 A1 | 9/2006 |
| WO | 2010123458 A1 | 10/2010 |
| WO | 2013123482 A1 | 8/2013 |
| WO | 2013166763 A1 | 11/2013 |
| WO | 2013187686 A1 | 12/2013 |
| WO | 2016115400 A1 | 7/2016 |
| WO | 2017040933 A1 | 3/2017 |
| WO | 2018166652 A1 | 9/2018 |
| WO | 2018195200 A1 | 10/2018 |

OTHER PUBLICATIONS

Non-Final Office Action for U.S. Appl. No. 17/448,441 dated Nov. 22, 2023.

U.S. Appl. No. 62/985,480.

* cited by examiner

DELIVERY SYSTEM

The delivery of products to stores from distribution centers has many steps that are subject to errors and inefficiencies. When the order from the customer is received, at least one pallet is loaded with the specified products according to a "pick list."

For example, the products may be cases of beverage containers (e.g. cartons of cans and beverage crates containing bottles or cans, etc). There are many different permutations of flavors, sizes, and types of beverage containers delivered to each store. When building pallets, missing or mis-picked product can account for significant additional operating costs.

The loaded pallet(s) are then loaded on a truck, along with pallets for other stores. Misloaded pallets cause significant time delays to the delivery route since the driver will have to rearrange the pallets during the delivery process with potentially limited space in the trailer to maneuver. Extra pallets on trucks can also cause additional loading times to find the errant pallet and re-load it on the correct trailer At the store, the driver unloads the pallet(s) designated for that location. Drivers often spend a significant amount of time waiting in the store for a clerk to become available to check in the delivered product by physically counting it. During this process the clerk ensures that all product ordered is being delivered. The driver and clerk often break down the pallet and open each case to scan one UPC from every unique flavor and size. After the unique flavor and size is scanned, both the clerk and driver count the number of cases or bottles for that UPC. This continues until all product is accounted for on all the pallets. Clerks are typically busy helping their own customers which forces the driver to wait until a clerk becomes available to check-in product.

SUMMARY

The improved delivery system provides improvements to several phases of the delivery process. Although these improvements work well when practiced together, fewer than all, or even any one of these improvements could be practiced alone to some benefit.

The improved delivery system facilitates order accuracy from the warehouse to the store by combining machine learning and computer vision software with a serialized (RFID/Barcode) shipping pallet. Pallet packing algorithms are based on the product mix and warehouse layout.

Electronic order accuracy checks are done while building pallets, loading pallets onto trailers and delivering pallets to the store. When building pallets, the delivery system validates the build to ensure the correct product SKUs are being loaded on the correct pallet according to the pick list. Once the pallet is built the overall computer vision sku count for that specific pallet is compared against the pick list for that specific pallet to ensure the pallet is built correctly. This may be done prior to the pallet being stretch wrapped thus mitigating the cost of unwrapping of the pallet to audit and correct. This also prevents shortages and overages at the delivery point thus preventing the driver from having to bring back excess or make additional trips to deliver missing product.

An optimized queue system may then be used to queue and load pallets onto the trailer in the correct reverse-stop sequence (last stop is loaded onto the trailer first). An electronic visual control showing which pallet is to be loaded on which trailer will be visible to the loader, e.g: Loading pallet #3 on Dock #4 . . .

The system will also decrease the time for the receiver at the delivery point (e.g. store) to check-in the product through a combination of checks that build trust at the delivery point. This is done through conveyance of the computer vision images of the validated SKUs on the pallet before it left the warehouse and upon delivery to the store. This can be a comparison of single images or a deep machine learning by having the image at the store also electronically identify the product SKUs. Delivery benefits include significantly reducing costs associated with waiting and checking product in at the store level and a verifiable electronic ledger of what was delivered for future audit.

The delivery system will utilize a mobile device that the driver or receiver will have that takes one or more still images of the pallet (for example, 4, i.e. 1 on each side). The image(s) can then be compared electronically to the control picture from the warehouse and physically by the clerk. The clerk can electronically sign off that all product SKUs are there against their pick list. Different levels of receipt will be available for the clerk to approve. Validation at the store can be simple pallet serial scan via RFID/Barcode and GPS coordinates against the delivery, pallet image compare and/or sku validation through a machine learning computer vision algorithm called from the mobile device.

BRIEF DESCRIPTION OF THE DRAWINGS

FIG. 28 shows an example screen indicating a validated loaded pallet at the distribution center.

FIG. 29 shows an example screen indicating a mis-picked loaded pallet at the distribution center.

DETAILED DESCRIPTION

Figure 1:
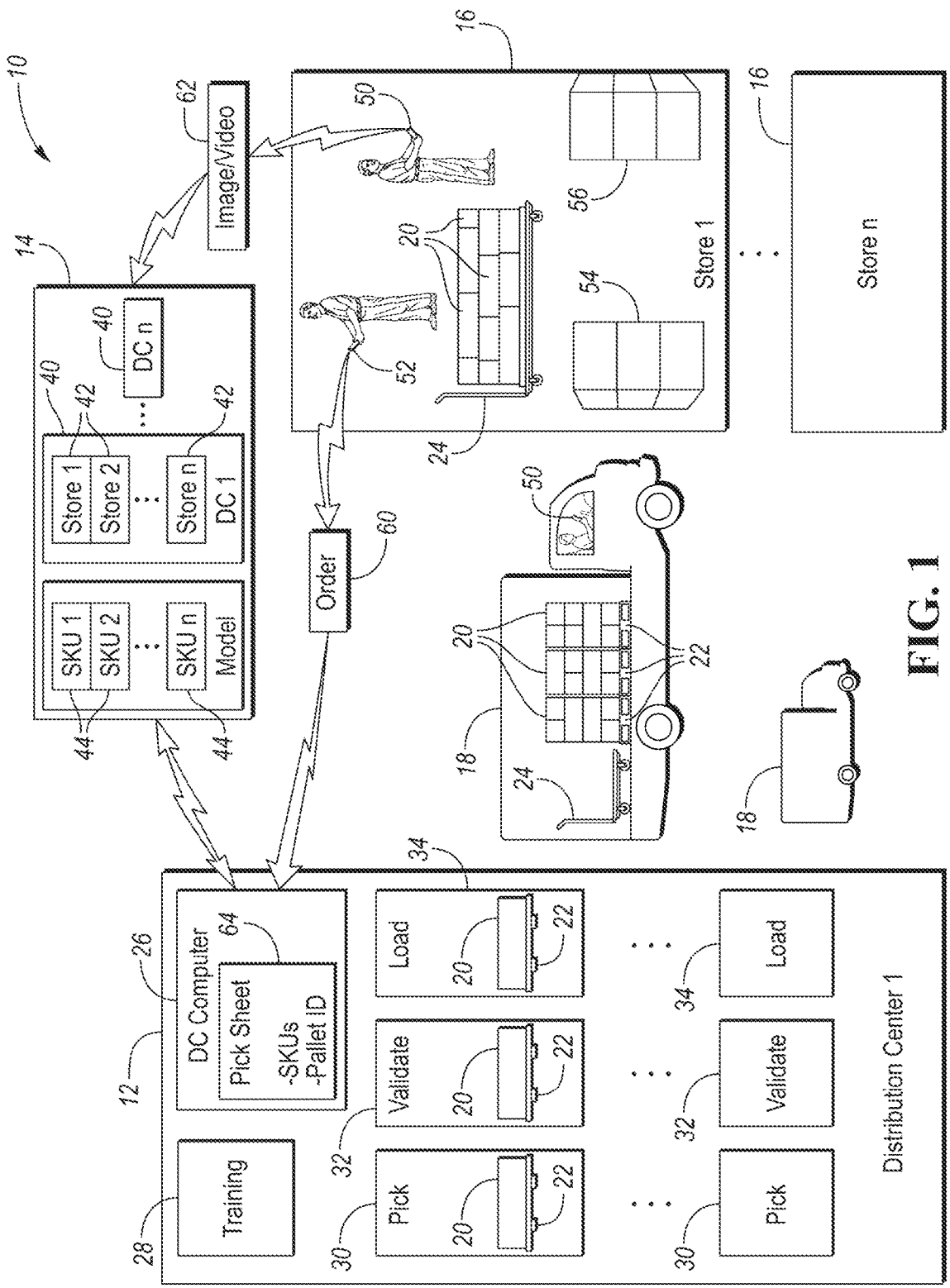
FIG. 1 is a schematic view of a delivery system.

FIG. 1 is a high level view of a delivery system 10 including one or more distribution centers 12, a central server 14 (e.g. cloud computer), and a plurality of stores 16. A plurality of trucks 18 or other delivery vehicles each transport the products 20 on pallets 22 from one of the distribution centers 12 to a plurality of stores 16. Each truck 18 carries a plurality of pallets 22 which may be half pallets, each loaded with a plurality of goods 20 for delivery to one of the stores 16. A wheeled sled 24 is on each truck 18 to facilitate delivery of one of more pallets 22 of goods 20 to each store 16. Generally, the goods 20 could be loaded on the half pallets 22, full-size pallets, carts, or hand carts, or dollies—all considered "platforms" herein.

Each distribution center 12 includes one or more pick stations 30 each associated with a validation station 32. Each validation station 32 is associated with a loading station 34, such as a loading dock for loading the trucks 18.

Each distribution center 12 may have a plurality of loading stations 34. Each distribution center 12 includes a DC computer 26. The DC computer 26 receives orders 60 from the stores 16 and communicates with a central server 14. Each DC computer 26 receives orders and generates pick sheets 64, each of which stores SKUs and associates them with pallet ids. Alternatively, the orders 60 can be sent from the DC computer 26 to the central server 14 for generation of the pick sheets 64, which are synched back to the DC computer 26.

Some or all of the distribution centers 12 may include a training station 28 for generating image information and other information about new products 20 which can be transmitted to the central server 14 for analysis and future use.

The central server 14 may include a plurality of distribution center accounts 40, including DC1-DCn, each associated with a distribution center 12. Each DC account 40 includes a plurality of store accounts 42, including store 1-store n. The orders 60 and pick sheets 64 for each store are stored in the associated store account 42. The central server 14 further includes a machine learning model including a plurality of SKU files 44, including SKU 1-SKUn. The model is periodically synched to the DC computers 26.

The SKU files 44 each contain information for a SKU. A "SKU" may be a single variation of a product that is available from the distribution center 12 and can be delivered to one of the stores 16. For example, each SKU may be associated with a particular number of containers (e.g. 12 pack) in a particular form (e.g. can v bottle), with particular packaging (cardboard vs reusable plastic crate, etc), having a particular flavor, and a particular size (e.g. 24 ounces). This information is contained in each SKU file 44 along with the name of the product, a description of the product, dimensions of the product, and image information for the product. Each SKU file 44 may also include the weight of the product. Image information may be further decomposed into text and color information. It is also possible that more than one variation of a product may share a single SKU, such as where only the packaging, aesthetics, and outward appearance of the product varies, but the content and quantity is the same. For example, sometimes promotional packaging may be utilized, which would have different image information for a particular SKU. In general, all the SKU files 44 including their associated image information, may be generated through the training module 28.

Figure 25A:
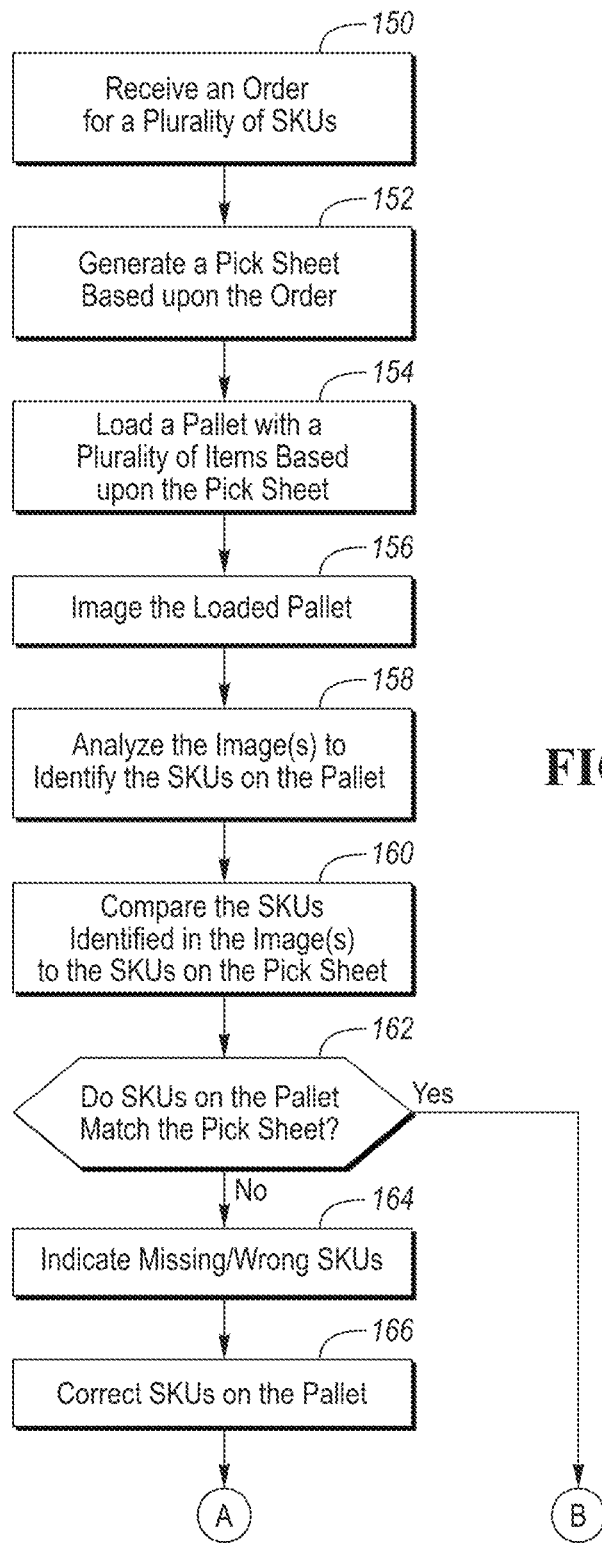
FIGS. 25A and 25B are a flowchart of one version of a method for delivering items.

Referring also to the flowchart in FIG. 25A, an order 60 may be received from a store 16 in step 150. As an example, an order 60 may be placed by a store employee using an app or mobile device 52. The order 60 is sent to the distribution center computer 26 (or alternatively to the server 14, and then relayed to the proper (e.g. closest) distribution center computer 26). The distribution center computer 26 analyzes the order 60 and creates a pick sheet 64 associated with that order 60 in step 152. The pick sheet 64 assigns each of the SKUs (including the quantity of each SKU) from the order. The pick sheet 64 specifies how many pallets 22 will be necessary for that order (as determined by the DC computer 26). The DC computer 26 may also determine which SKUs should be loaded near one another on the same pallet 22, or if more than one pallet 22 will be required, which SKUs should be loaded on the same pallet 22. For example, SKUs that go in the cooler may be together on the same pallet (or near one another on the same pallet), while SKUs that go on the shelf may be on another part of the pallet (or on another pallet, if there is more than one). If the pick sheet 64 is created on the DC computer 26, it is copied to the server 14. If it is created on the server 14, it is copied to the DC computer 26.

Figure 2:
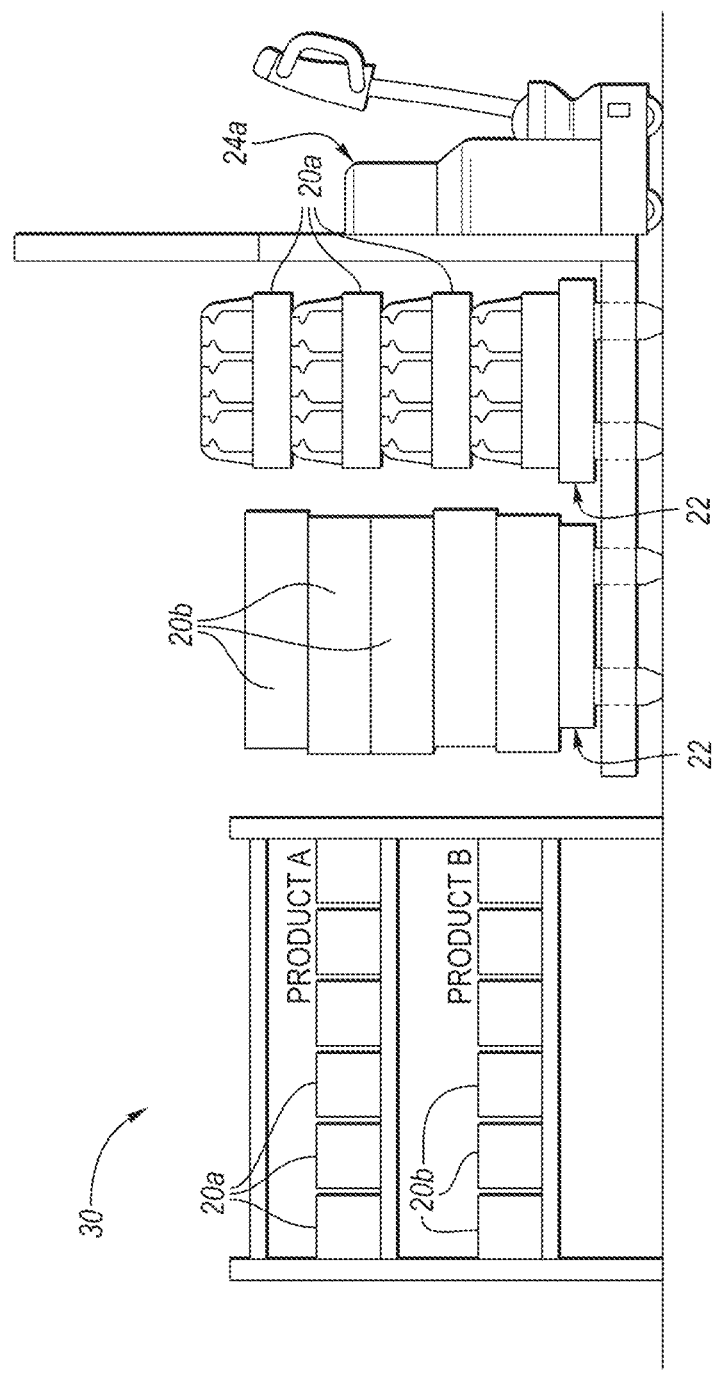
FIG. 2 shows an example loading station of the delivery system of FIG. 1.
Figure 13:
FIG. 13 is an example screen of a mobile app for confirming a pallet id in the delivery system of FIG. 1.

FIG. 2 shows the pick station 30 of FIG. 1. Referring to FIGS. 1 and 2, workers at the distribution center read the palled id (e.g. via rfid, barcode, etc) on the pallet(s) 22 on a pallet jack 24a (see screenshot of FIG. 13), such as with a mobile device or a reader on the pallet jack 24a. Shelves may contain a variety of items 20 for each SKU, such as first product 20a of a first SKU and a second product 20b of a second SKU (collectively "products 20"). A worker reading a computer screen or mobile device screen displaying from the pick sheet 64 retrieves each product 20 and places that product 20 on the pallet 22. Alternatively, the pallet 22 may be loaded by automated handling equipment.

Workers place items 20 on the pallets 22 according to the pick sheets 64, and report the palled ids to the DC computer 26 in step 154. The DC computer 26 dictates merchandizing groups and sub groups for loading items 20a, b on the pallets 22 in order to make unloading easier at the store. In the example shown, the pick sheets 64 dictate that products 20a are on one pallet 22 while products 20b are on another pallet 22. For example, cooler items should be grouped, and dry items should be grouped. Splitting of package groups is also minimized to make unloading easer. This makes pallets 22 more stable too.

After one pallet 22 is loaded, the next pallet 22 is brought to the pick station 30, until all of the SKUs required by the pick sheet 64 are loaded onto as many pallets 22 as required by that pick sheet 64. Pallets 22 are then loaded for the next pick sheet 64. The DC computer 26 records the pallet ids of the pallet(s) 22 that have been loaded with particular SKUs for each pick sheet 64. The pick sheet 64 may associate each pallet id with each SKU.

After being loaded, each loaded pallet 22 is validated at the validation station 32, which may be adjacent to or part of the pick station 30. As will be described in more detail below, at least one still image, and preferably several still images or video, of the products 20 on the pallet 22 is taken at the validation station 32 in step 156. The pallet id of the pallet 22 is also read. The images are analyzed to determine the SKUS of the products 20 that are currently on the identified pallet 22 in step 158. The SKUs of the products 20 on the pallet 22 are compared to the pick sheet 64 by the DC computer 26 in step 160, to ensure that all the SKUs associated with the pallet id of the pallet 22 on the pick sheet 64 are present on the correct pallet 22, and that no additional SKUs are present. Several ways are of performing the aforementioned steps are disclosed below.

Figure 4:
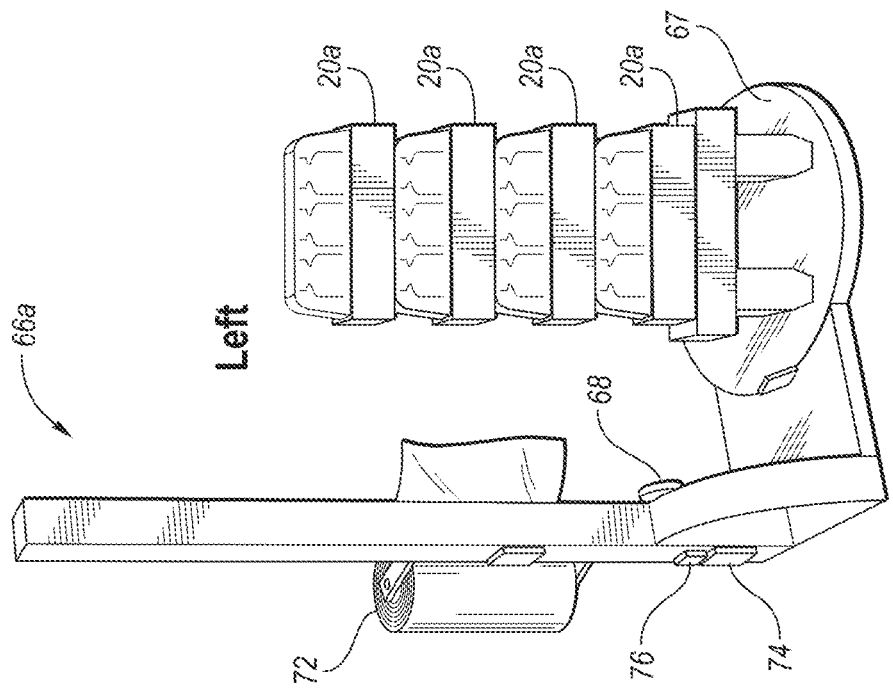
FIG. 4 is another view of the example validation system of FIG. 3 with a loaded pallet thereon.
Figure 3:
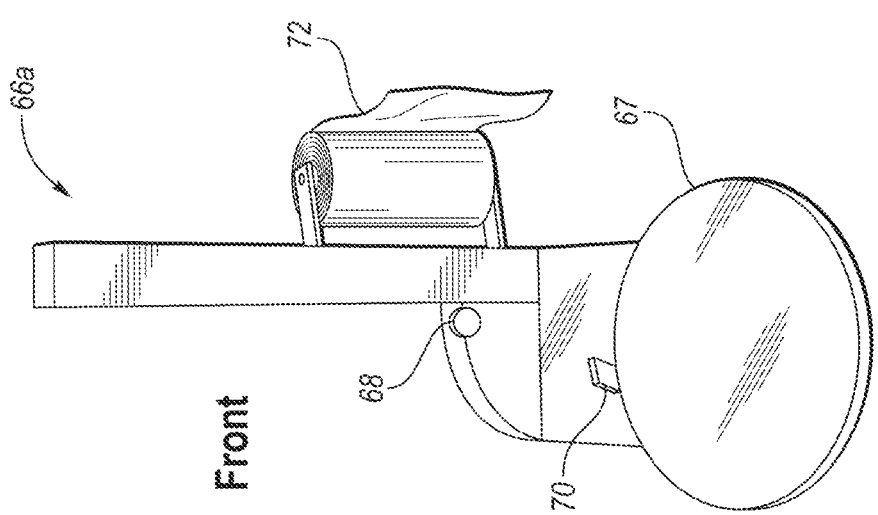
FIG. 3 shows an example validation station of the delivery system of FIG. 1.

First, referring to FIGS. 3 and 4, the validation station may include a CV/RFID semi-automated wrapper 66a with turntable 67 may be specially fitted with a camera 68 and rfid reader 70 (and/or barcode reader). The wrapper 66a holds a roll of translucent, flexible, plastic wrap or stretch wrap 72. As is known, a loaded pallet 22 can be placed on the turntable 67, which rotates the loaded pallet 22 as stretch wrap 72 is applied. The camera 68 may be a depth camera. In this wrapper 66a, the camera 68 takes at least one image of the loaded pallet 22 while the turntable 67 is rotating the loaded pallet 22, prior to or while wrapping the stretch wrap 72 around the loaded pallet 22. Images/video of the loaded pallet 22 after wrapping may also be generated. As used herein, "image" or "images" refers broadly to any combination of still images and/or video, and "imaging" means capturing any combination of still images and/or video. Again, preferably 2 to 4 still images, or video, are taken.

In one implementation, the camera 68 is recording video (or a continuously changing image), while the turntable 67 is rotating. When the camera 68 detects that the two outer ends of the pallet 22 are equidistant (or otherwise that the side of the pallet 22 facing the camera 68 is perpendicular to the camera 68 view), the camera 68 records a still image. The camera 68 can record four still images in this manner, one of each side of the pallet 22.

The rfid reader 70 (or barcode reader, or the like) reads the pallet id (a unique serial number) from the pallet 22. The wrapper 66a includes a local computer 74 in communication with the camera 68 and rfid reader 70. The computer 74 can communicate with the DC computer 26 (and/or server 14) via a wireless network card 76. The image(s) and the pallet id are sent to the server 14 via the network card 76 and associated with the pick list 64 (FIG. 1). Optionally, a weight sensor can be added to the turntable 67 and the known total weight of the products 20 and pallet 22 can be compared to the measured weight on the turntable 67 for confirmation. An alert is generated if the total weight on the turntable 67 does not match the expected weight.

As an alternative, the turntable 67, camera 68, rfid reader 70, and computer 74 of FIGS. 3 and 4 can be used without the wrapper. The loaded pallet 22 can be placed on the turntable 67 for validation only and can be subsequently wrapped either manually or at another station.

Figure 5:
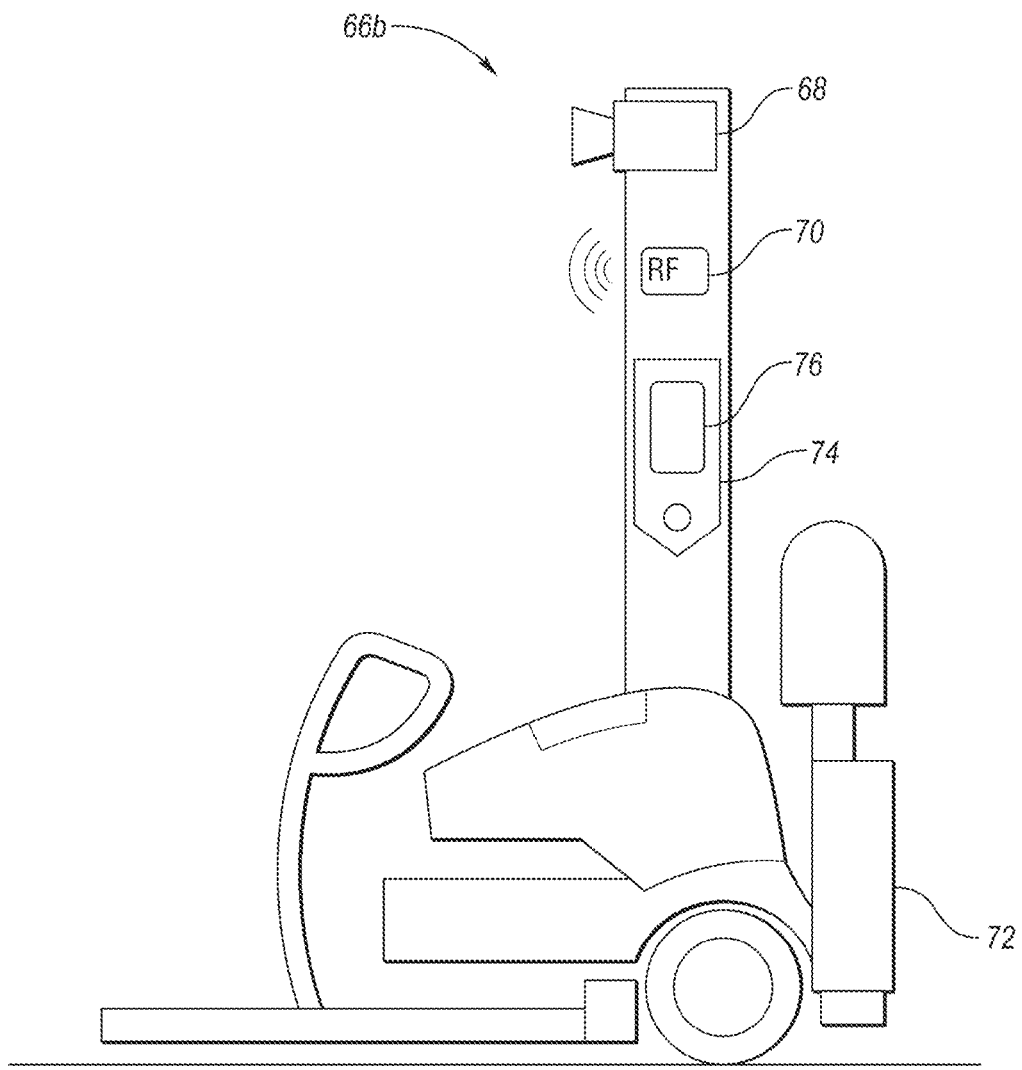
FIG. 5 shows another example validation system of the delivery system of FIG. 1.
Figure 6:
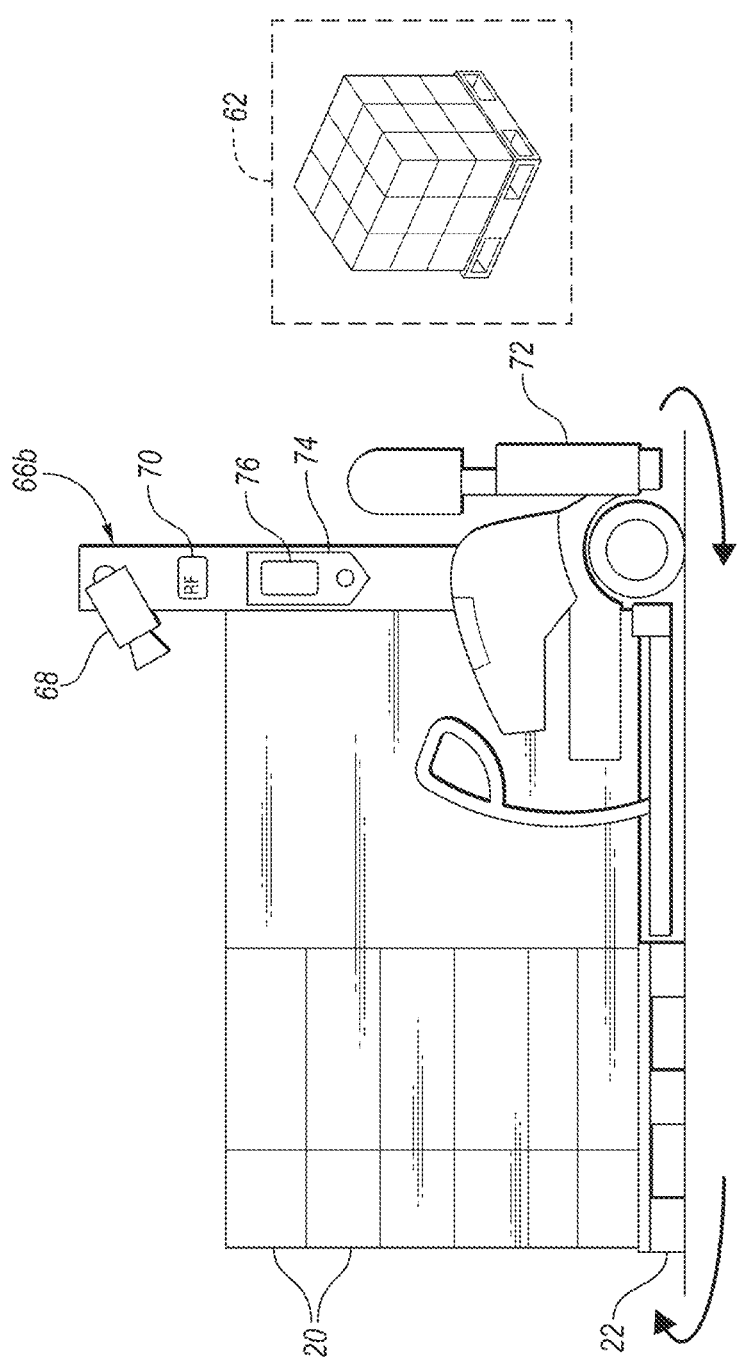
FIG. 6 shows the validation system of FIG. 5 in the process of wrapping a loaded pallet.

Alternatively, referring to FIGS. 5 and 6, the validation station can include the camera 68 and rfid reader 70 (or barcode reader, or the like) mounted to a robo wrapper 66b. As is known, instead of holding the stretch wrap 72 stationary and rotating the pallet 22, the robo wrapper 66b travels around the loaded pallet 22 with the stretch wrap 72 to wrap the loaded pallet 22. The robo wrapper 66b includes the camera, 68, rfid reader 70, computer 74 and wireless network card 76.

FIG. 6 shows the robo wrapper 66b wrapping the loaded pallet 22 and items 20 with stretch wrap 72 (as is commonly used) and generating at least one image 62 of the loaded pallet 22. The robo wrapper 66b travels around the loaded pallet 22 and generates at least one image 62 of the loaded pallet 22 prior to and/or while wrapping the loaded pallet 22. Images of the loaded pallet 22 after wrapping may also be generated. Other than the fact that the robo wrapper 66b travels around the stationary loaded pallet 22, the robo wrapper 66b operates the same as the wrapper 66b of FIGS. 3 and 4.

Figure 7:
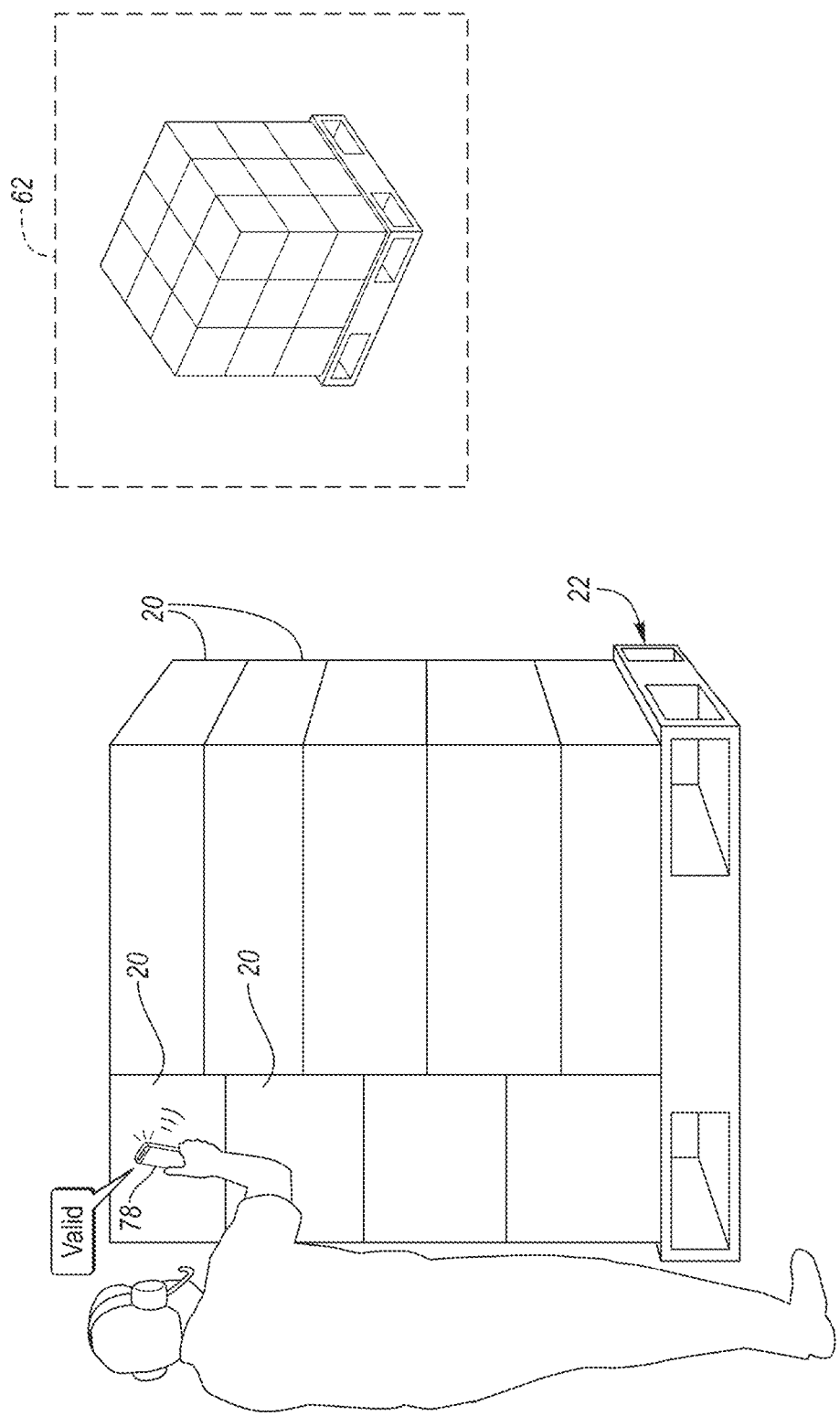
FIG. 7 shows yet another example validation system of the delivery system of FIG. 1.
Figure 14:
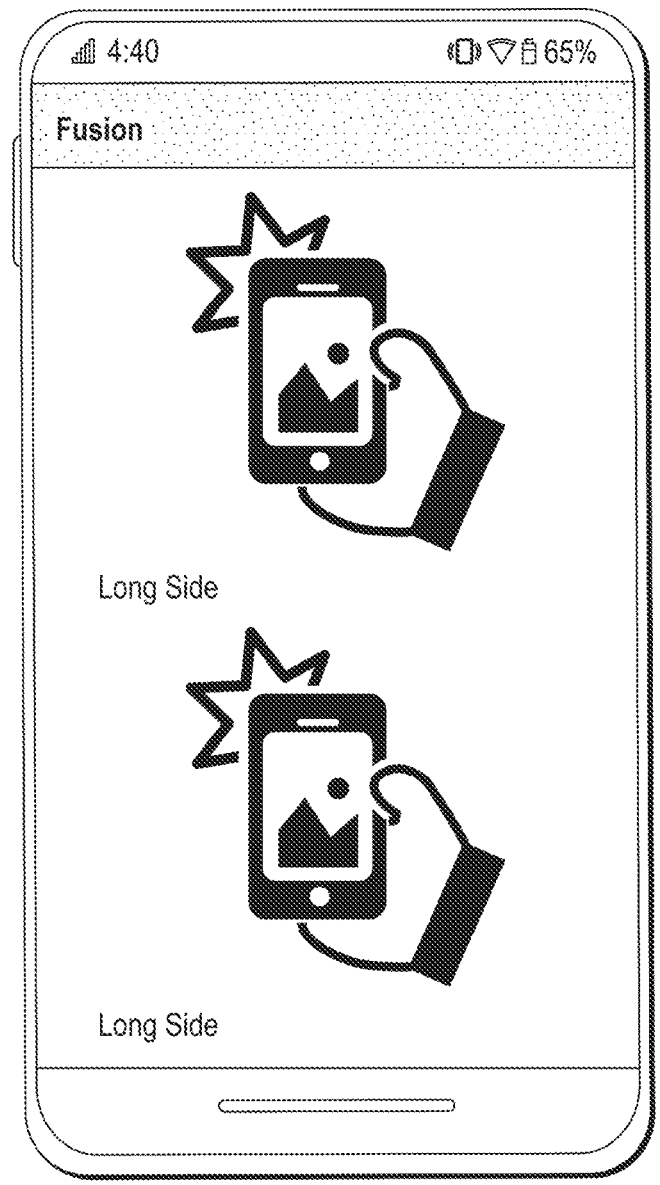
FIG. 14 is an example screen of a mobile app for imaging the loaded pallet for validation in the delivery system of FIG. 1.
Figure 15:
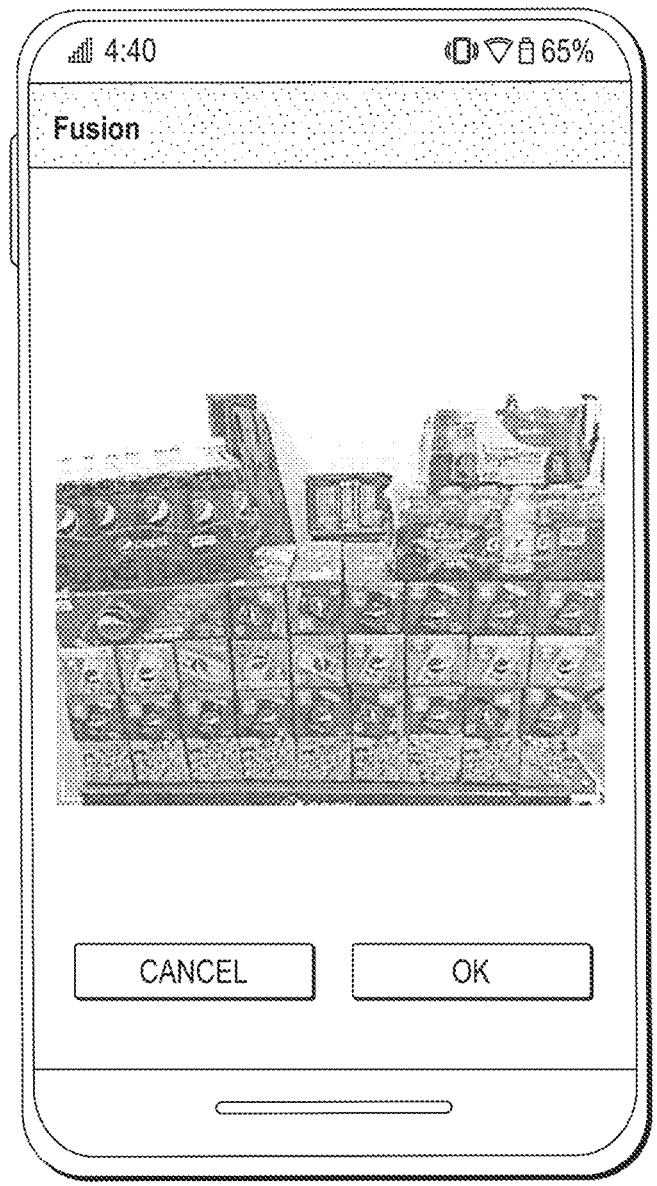
FIG. 15 is an example screen of a mobile app in which the user can approve an image of the loaded pallet from FIG. 14.
Figure 16:
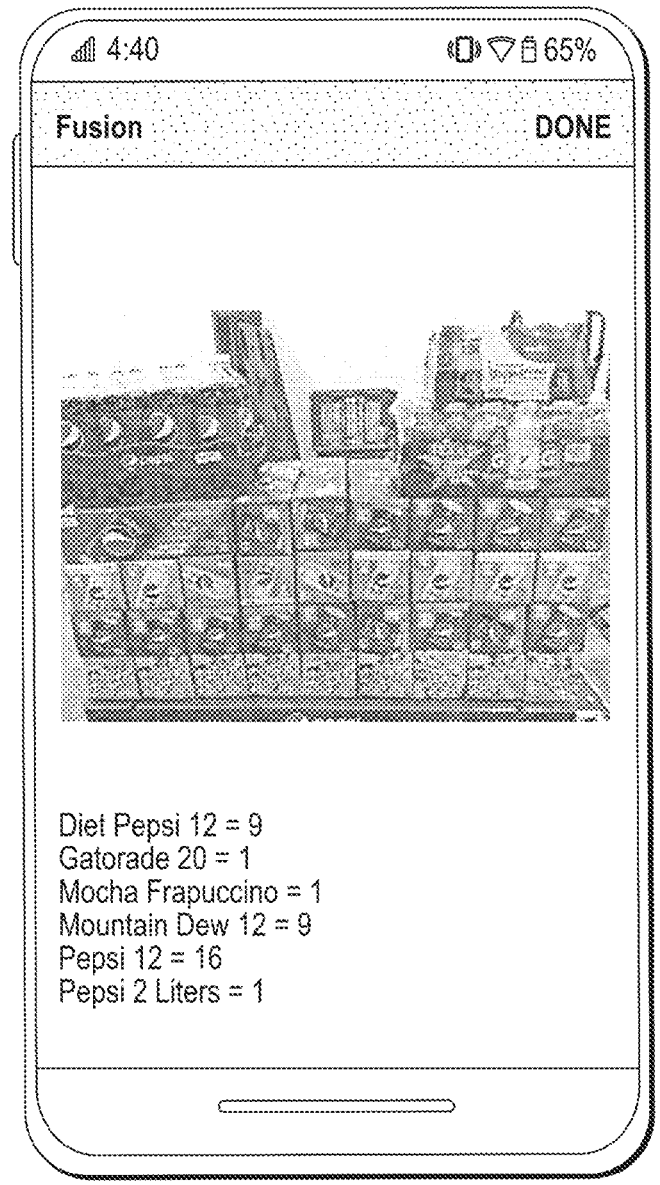
FIG. 16 is a screenshot of the app on the mobile device indicating the quantity of each sku that has been identified on the loaded pallet in the image of FIG. 15.

Alternatively, referring to FIG. 7, the validation station can include a worker with a networked camera, such as on a mobile device 78 (e.g. smartphone or tablet) for taking one or more images 62 of the loaded pallet 22, prior to wrapping the loaded pallet 22. FIG. 14 is a screenshot of the app on the mobile device 78 instructing the user to take two still images of the long sides of the loaded pallets 22 (alternatively, the user could take video while walking around the pallet 22). FIG. 15 is a screenshot of the app on the mobile device 78 on which the user can approve the image the user took. FIG. 16 is a screenshot of the app on the mobile device 78 indicating the quantity of products 20 of each sku that has been identified on the pallet 22.

Other ways can be used to gather images of the loaded pallet. In any of the methods, the image analysis and/or comparison to the pick list is performed on the DC computer 26, which has a copy of the machine learning model. Alternatively, the analysis and comparison can be done on the server 14, locally on a computer 74, or on the mobile device 78, or on another locally networked computer.

As mentioned above, the camera 68 (or the camera on the mobile device 78) can be a depth camera, i.e. it also provides distance information correlated to the image (e.g. pixel-by-pixel distance information or distance information for regions of pixels). Depth cameras are known and utilize various technologies such as stereo vision (i.e. two cameras) or more than two cameras, time-of-flight, or lasers, etc. If a depth camera is used, then the edges of the products stacked on the pallet 22 are easily detected (i.e. the edges of the entire stack and possibly edges of individual adjacent products either by detecting a slight gap or difference in adjacent angled surfaces). Also, the depth camera 68 can more easily detect when the loaded pallet 22 is presenting a perpendicular face to the view of the camera 68 for a still image to be taken.

However the image(s) of the loaded pallet 22 are collected, the image(s) are then analyzed to determine the sku of every item 20 on the pallet 22 in step 158 (FIG. 25A). Images and dimensions of all sides of every possible product, including multiple versions of each SKU, if applicable, are stored in the server 14. If multiple still images or video are collected, then the known dimensions of the pallet 22 and the items 20 are used to ensure that every item 20 is counted once and only once. For example, the multiple sides of the loaded pallet 22 may be identified in the images first.

Then, the layers of items 20 are identified on each side. The individual items 20 are then identified on each of the four sides of the loaded pallet 22.

The package type of each item 20 is identified by the computer, such as reusable beverage crate, corrugated tray with translucent plastic wrap, or fully enclosed cardboard or paperboard box. The branding of each item 20 is also identified by the computer (e.g. a specific flavor from a specific manufacturer), such as by reading the images/text on the packaging. The packaging may be identified first, thus narrowing the list of possible branding options to be identified. Or vice versa, the branding could be determined and used to narrow the possible packaging options to be identified. Alternatively, the branding and packaging could be determined independently and cross-referenced afterward for verification. In any method, if one technique leads to an identification with more confidence, that result could take precedence over a contrary identification. For example, if the branding is determined with low confidence and the packaging is determined with high confidence, and the identified branding is not available in the identified packaging, the identified packaging is used and the next most likely branding that is available in the identified packaging is then used.

After individual items 20 are identified on each of the four sides of the loaded pallet 22, based upon the known dimensions of the items 20 and pallet 22, duplicates are removed, i.e. it is determined which items are visible from more than one side and appear in more than one image. If some items are identified with less confidence from one side, but appear in another image where they are identified with more confidence, the identification with more confidence is used.

For example, if the pallet 22 is a half pallet, its dimensions would be approximately 40 to approximately 48 inches by approximately 20 to approximately 24 inches, including the metric 800 mm×600 mm Standard size beverage crates, beverage cartons, and wrapped corrugated trays would all be visible from at least one side, most would be visible from at least two sides, and some would be visible on three sides.

If the pallet 22 is a full-size pallet (e.g. approximately 48 inches by approximately 40 inches, or 800 mm by 1200 mm), most products would be visible from one or two sides, but there may be some products that are not visible from any of the sides. The dimensions and weight of the hidden products can be determined as a rough comparison against the pick list. Optionally, stored images (from the SKU files) of SKUs not matched with visible products can be displayed to the user, who could verify the presence of the hidden products manually.

Figures 28, 29:
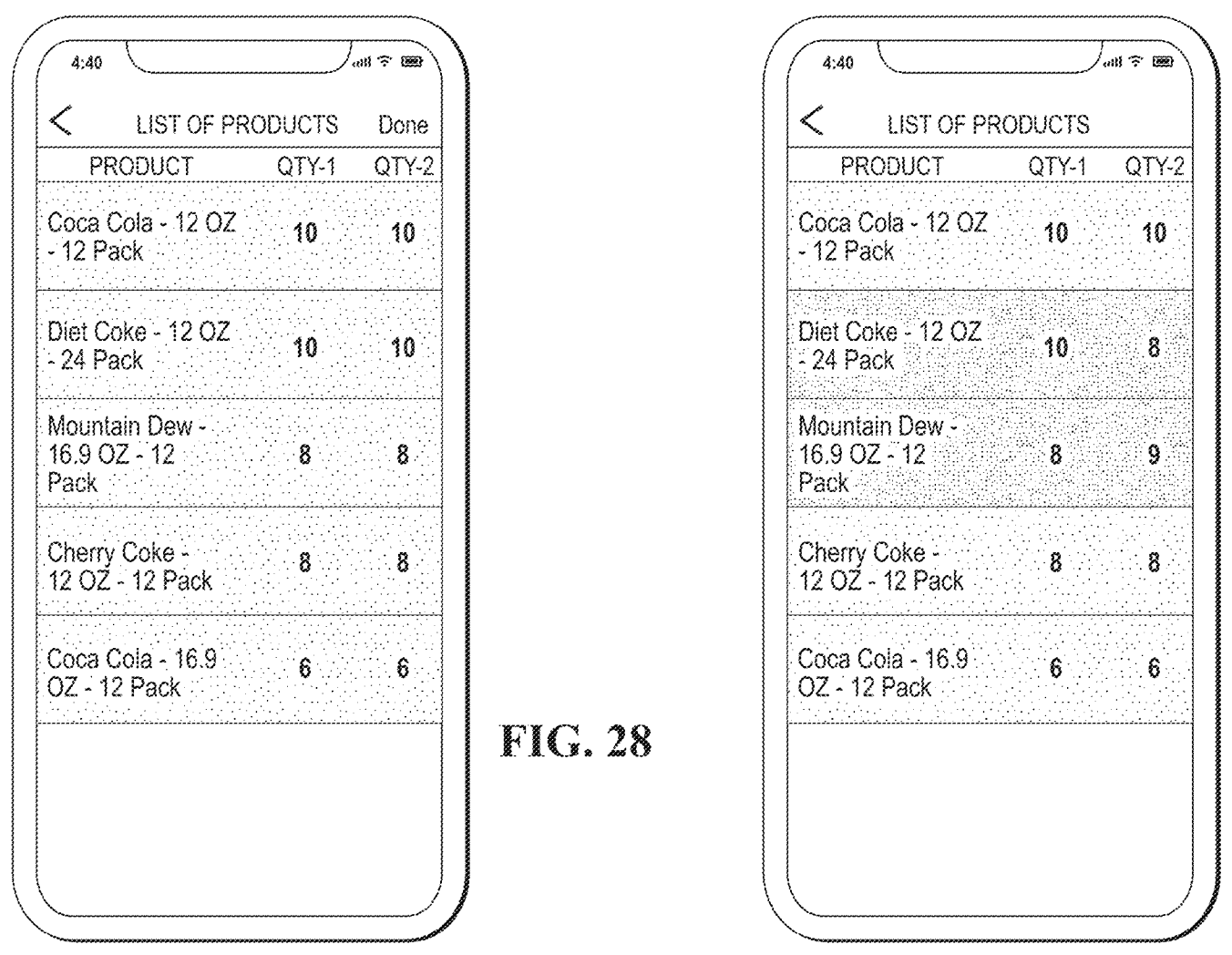

The computer vision-generated sku count for that specific pallet 22 is compared against the pick list 64 to ensure the pallet 22 is built correctly. This may be done prior to the loaded pallet 22 being wrapped thus preventing unwrapping of the pallet 22 to audit and correct. If the built pallet 22 does not match the pick list 64 (step 162), the missing or wrong SKUs are indicated to the worker (step 164), e.g. via a display (e.g. FIG. 29). Then the worker can correct the items 20 on the pallet 22 (step 166) and reinitiate the validation (i.e. initiate new images in step 156).

If the loaded pallet 22 is confirmed, positive feedback is given to the worker (e.g. FIG. 28), who then continues wrapping the loaded pallet 22 (step 168). Additional images may be taken of the loaded pallet 22 after wrapping. For example, four image may be taken of the loaded pallet before wrapping, and four more images of the loaded pallet 22 may be taken after wrapping. All images are stored locally and sent to the server 14. The worker then moves the validated loaded pallet 22 to the loading station 34 (step 170)

After the loaded pallet 22 has been validated, it is moved to a loading station 34 (FIG. 1). As explained in more detail below, at the loading station 34, the distribution center computer 26 ensures that the loaded pallets 22, as identified by each pallet id, are loaded onto the correct trucks 18 in the correct order. For example, pallets 22 that are to be delivered at the end of the route are loaded first.

A computer (DC computer 26, server 14, or another) determines efficient routes to be driven by each truck 18 to visit each store 16 in the most efficient sequence, the specific loaded pallets 22 that must go onto each truck 18, and the order in which the pallets 22 should be loaded onto the trucks 18.

Figure 8:
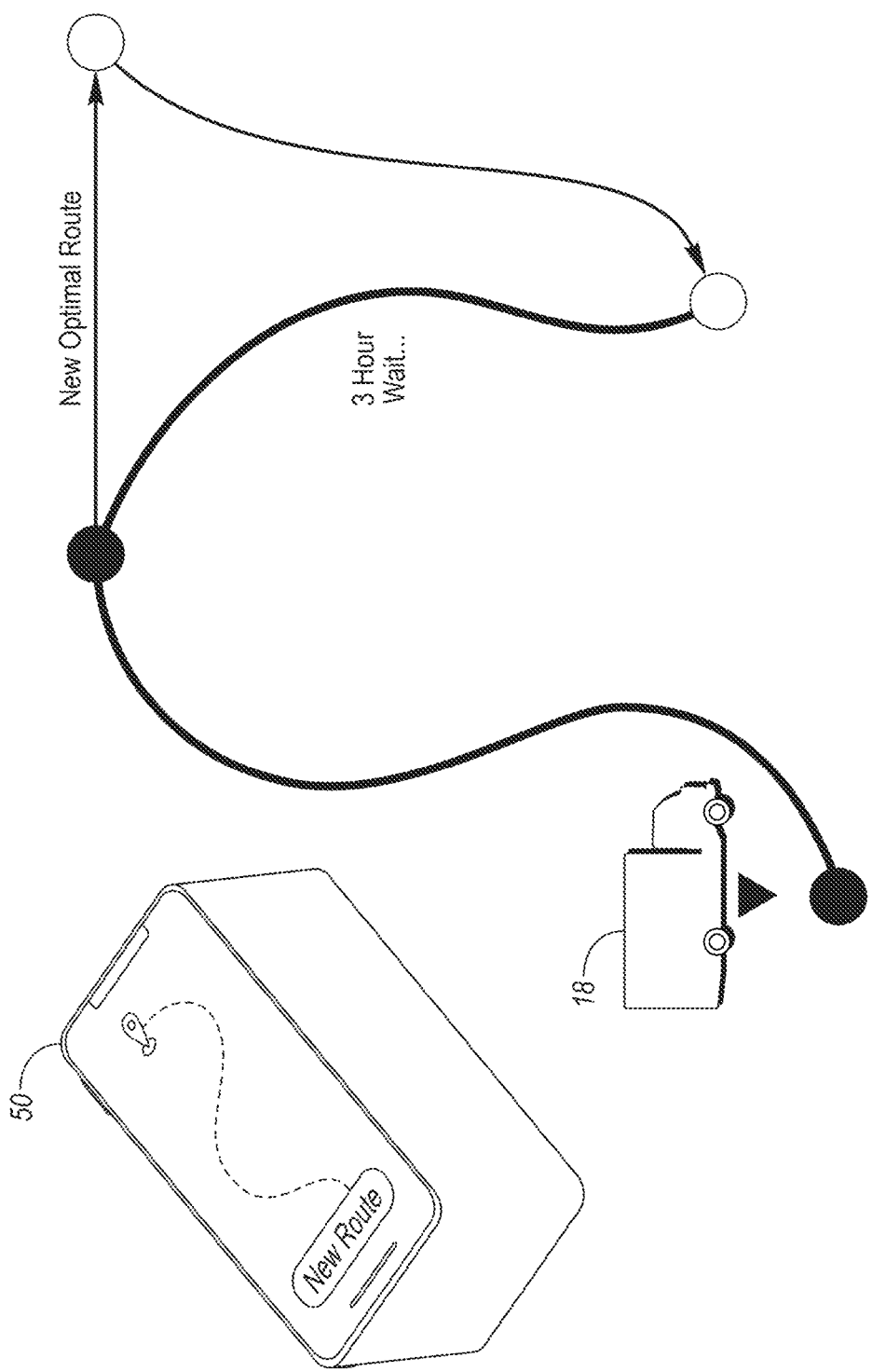
FIG. 8 shows a route optimization used in the delivery system of FIG. 1.

As shown in FIG. 8, a route for each truck 18 is optimized by server 14 so that an efficient route is plotted for the driver. As shown, the route is communicated to the driver's mobile device 50 (or on-board navigation system) and may be modified after the truck 18 has left the DC 12 as necessary (e.g. based upon traffic).

Figure 9:
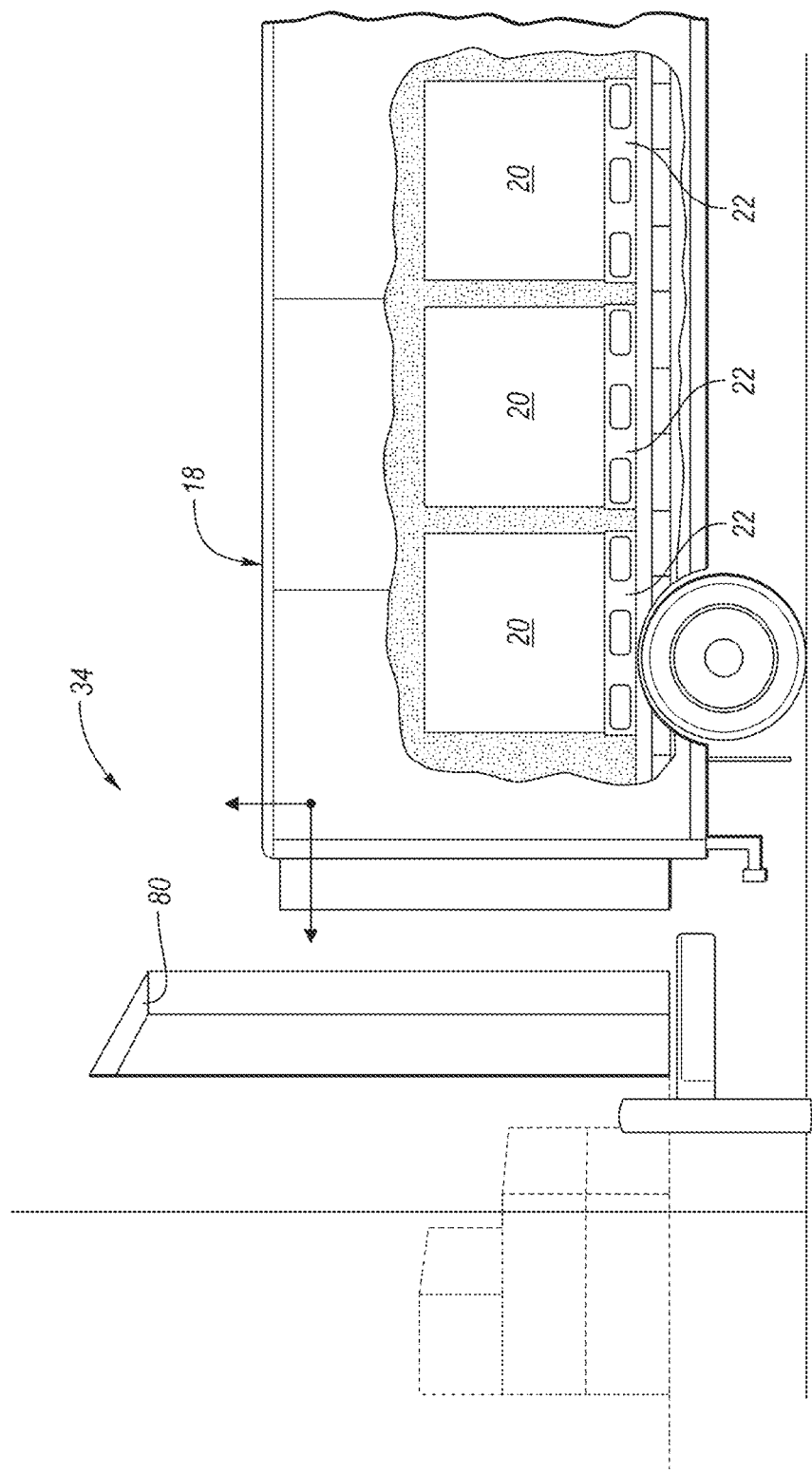
FIG. 9 shows an example loading station of the delivery system of FIG. 1.

Referring to FIG. 9, an optimized queue system is used to queue and load loaded pallets 22 onto the truck 18 in the correct reverse-stop sequence (last stop is loaded onto the truck 18 first) based upon the route planned for that truck 18. Each truck 18 will be at a different loading dock doorway 80.

Figure 10:
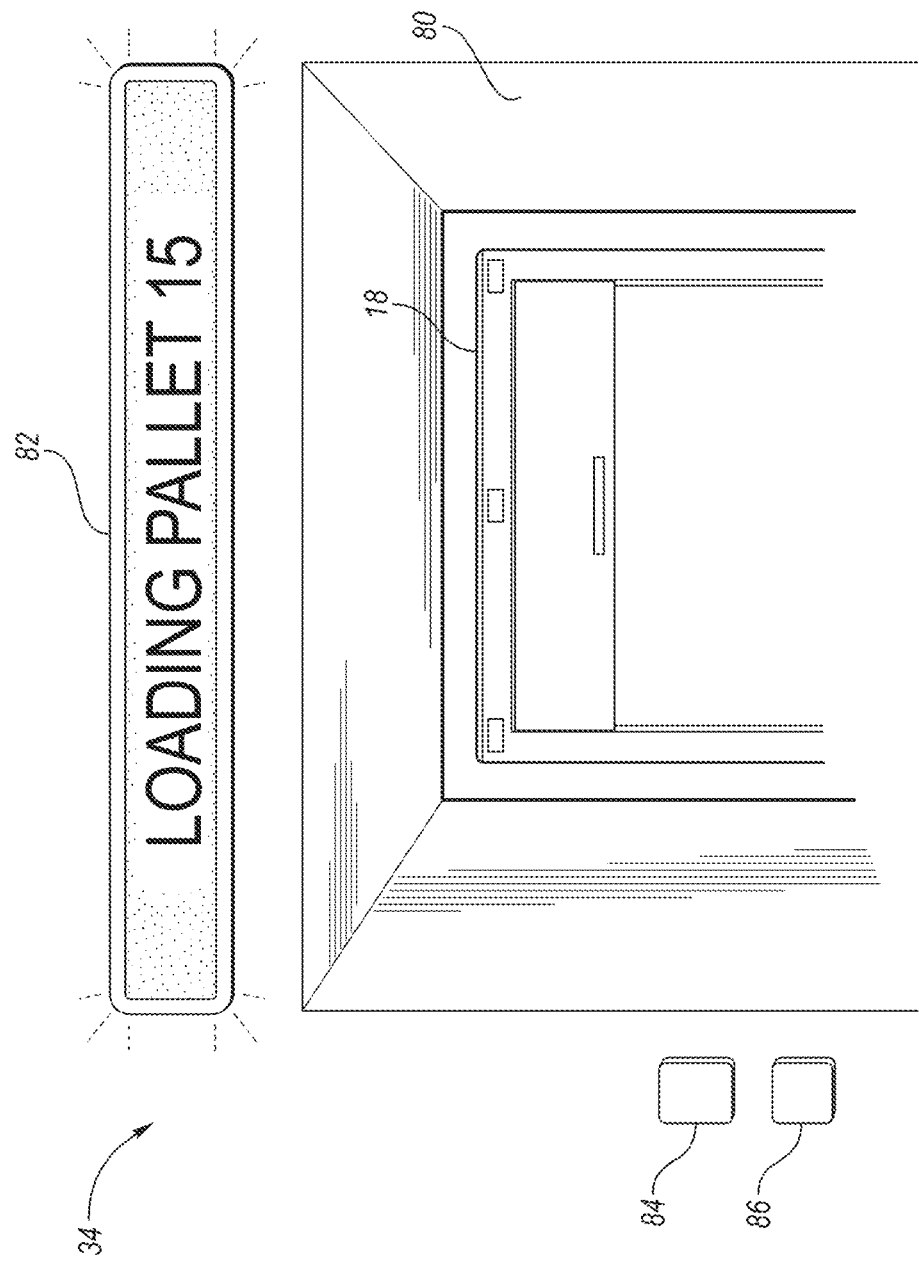
FIG. 10 is another view of the example loading station of FIG. 9.

FIG. 10 shows an example loading station 34, such as a loading dock with a doorway 80. Based upon the sequence determined by the server 14, an electronic visual display 82 proximate the doorway 80 shows which pallet 22 is to be loaded onto that truck 18 next. A camera 84 and/or rfid reader 86 adjacent the doorway 80 identifies each loaded pallet 22 as it is being loaded onto the truck 18. If the wrong pallet 22 is moved toward the doorway 80, an audible and/or visual alarm alerts the workers. Optionally, the rfid reader 86 at the doorway 80 is able to determine the direction of movement of the rfid tag on the loaded pallet 22, i.e. it can determine if the loaded pallet 22 is being moved onto the truck 18 or off of the truck 18. This is helpful if the wrong loaded pallet 22 is moved onto the truck 18. The worker is notified that the wrong pallet 22 was loaded, and the rfid reader 86 can confirm that the pallet was then moved back off the truck 18.

When a group of loaded pallets 22 (two or more) is going to the same store 16, the loaded pallets 22 within this group can be loaded onto the truck 18 in any order. The display 82 may indicate the group of loaded pallets 22 and the loaded pallets 22 within this group going to the same store 16 will be approved by the rfid reader 86 and display 82 in any order within the group.

Figure 11:
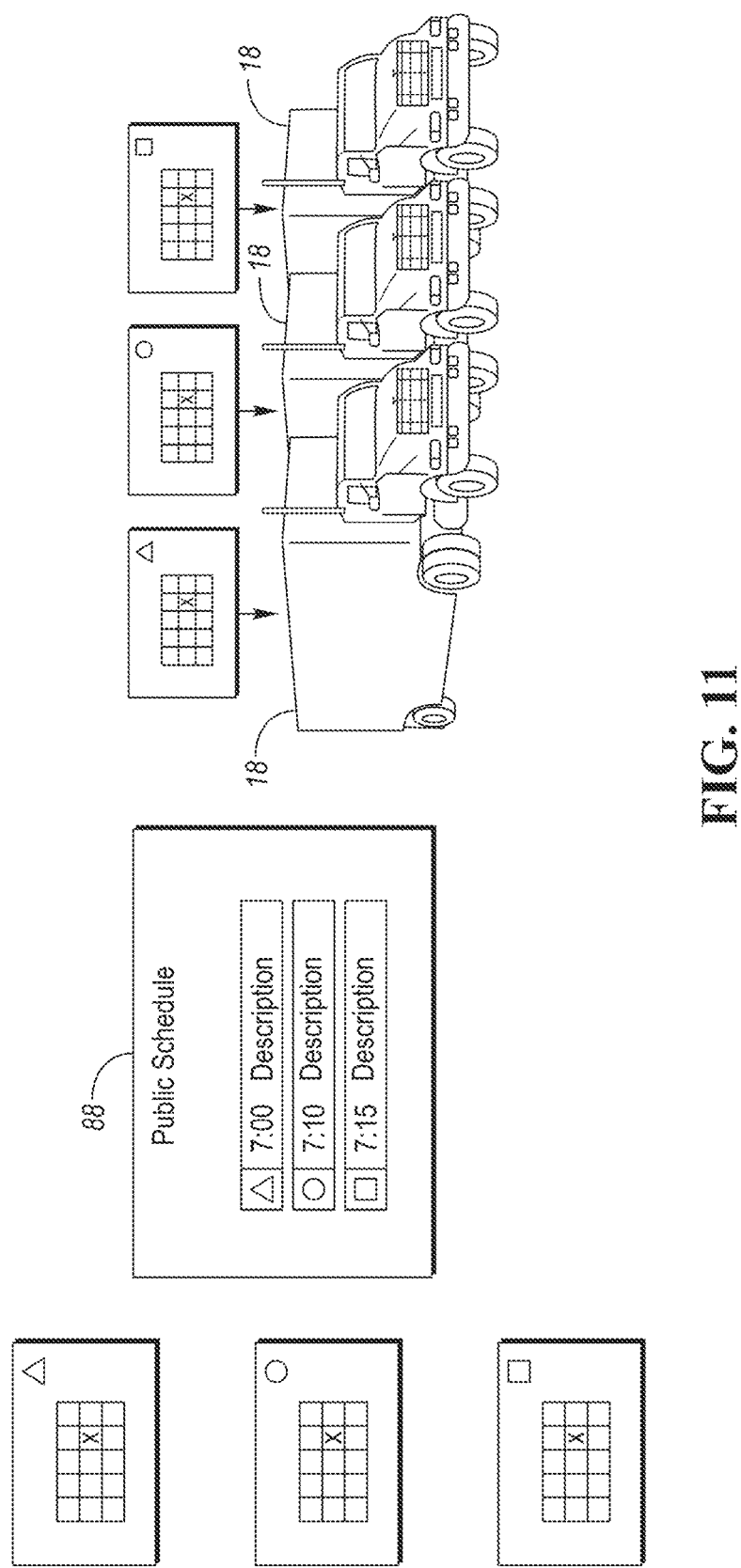
FIG. 11 shows a scheduling system of the delivery system of FIG. 1.

Referring to FIG. 11, a portal 88 (generated by server 14) provides visibility of truck 18 schedules for local companies to reduce wait times.

Figure 25B:
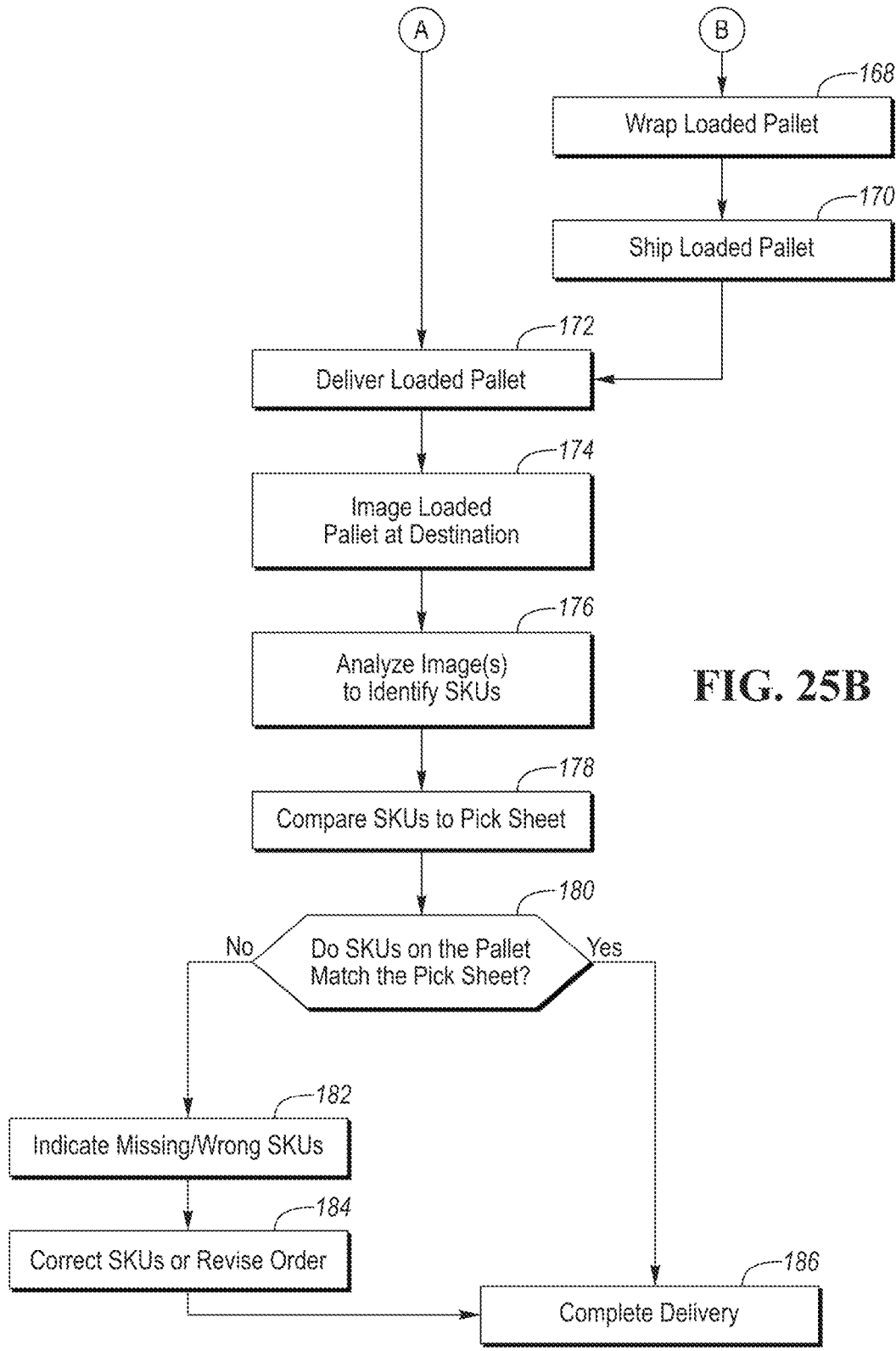

Referring to FIG. 1, the loaded truck 18 carries a hand truck or pallet sled 24, for moving the loaded pallets 22 off of the truck 18 and into the stores 16 (FIG. 25B, step 172). The driver has a mobile device 50 which receives the optimized route from the distribution center computer 26 or central server 14. The driver follows the route to each of the plurality of stores 16 for which the truck 18 contains loaded pallets 22.

At each store 16 the driver's mobile device 50 indicates which of the loaded pallets 22 (based upon their pallet ids) are to be delivered to the store 16 (as verified by gps on the mobile device 50). The driver verifies the correct pallet(s) for that location with the mobile device 50 that checks the pallet id (rfid, barcode, etc). The driver moves the loaded pallet(s) 22 into the store 16 with the pallet sled 24.

Figure 21:
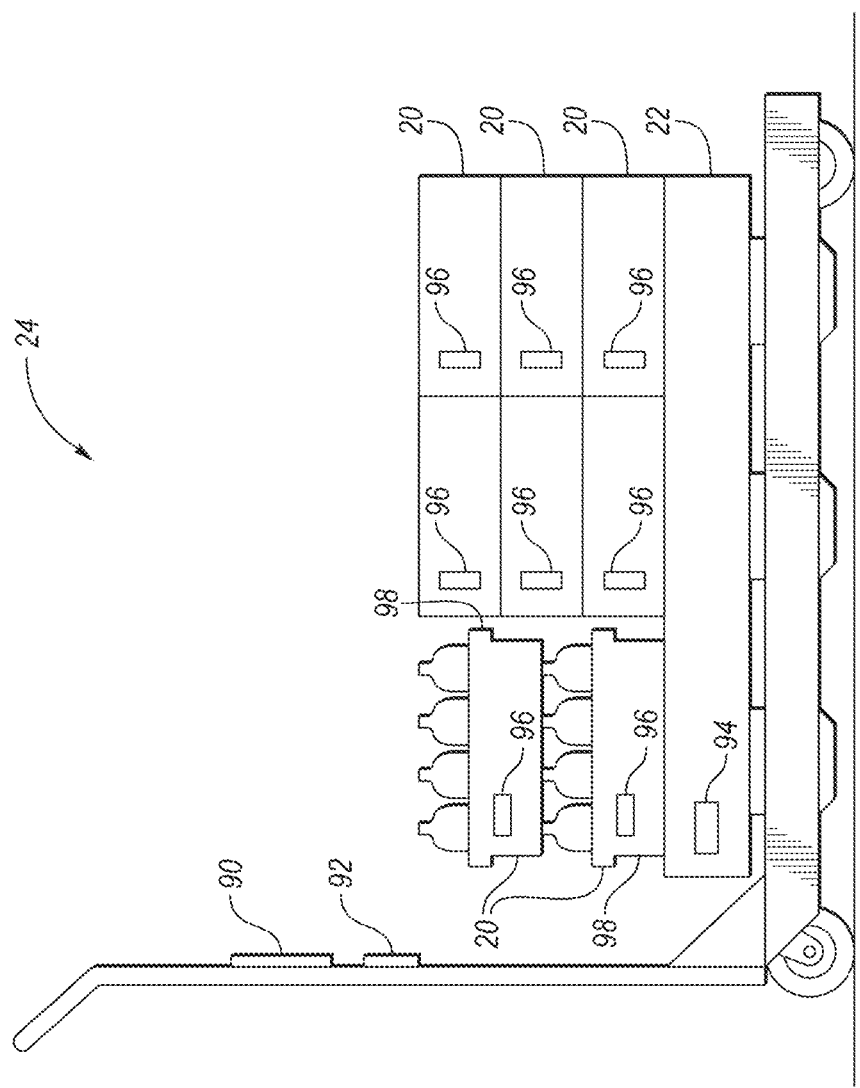
FIG. 21 shows an example pallet sled with a sensor and/or camera for identifying the pallet on the sled and the items on the pallet.

Referring to FIG. 21, optionally, the pallet sled 24 can include an rfid reader 90 to check the pallet id of pallet 22 carried thereon by reading the RFID tag 94 secured to the pallet 22. The rfid reader 90 may also read RFID tags 96 on the items 20. Optionally the pallet sled 24 may alternatively or additionally include a camera 92 for imaging the loaded pallet 22 carried thereon for validation. A local wireless communication circuit (e.g. Bluetooth) may communicate the pallet id of the pallet 22 on the pallet sled 24 to the driver's mobile device 50. The driver's mobile device 50 can confirm to the driver that the correct pallet 22 is loaded on the pallet sled 24 or warn the driver if the pallet 22 on the pallet sled 24 does not correspond to the store 16 at the current location (determined via gps on the mobile device 50).

The pallet sled 24 can also assist in tracking the return of the pallets 22 and returnable packaging such as plastic beverage crates 98. If the returnable packaging, such as plastic beverage crates 98, have rfid tags 96, the pallet sled 24 can count the number of crates 98 and the pallets 22 that are being returned to the truck 18. Over time, this can provide asset tracking information. For example, this makes it easy to determine if the number of pallets 22 and crates 98 delivered to a particular store 16 consistently exceeds the number of pallets 22 and crates 98 that are returned from that store 16, thus indicating that the store 16 is experiencing a high rate of asset loss for some reason, which can then be investigated and remedied.

One of several methods can then be followed at the store.

Figure 17:
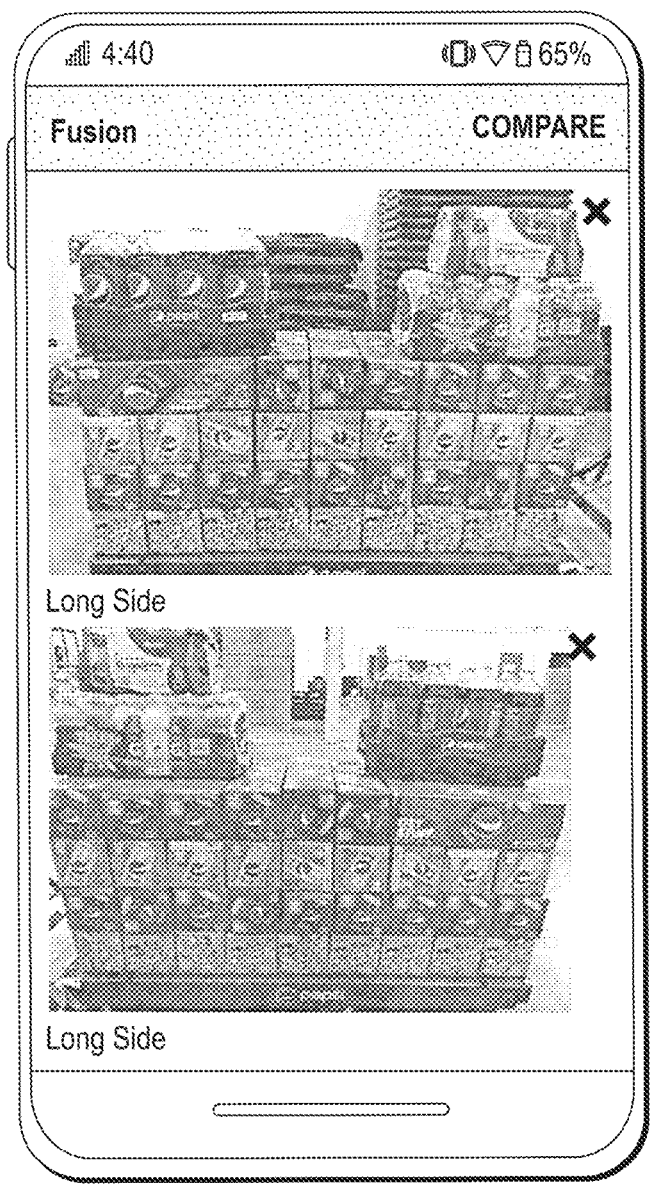
FIG. 17 shows an example screen of a mobile app in which the driver has imaged a loaded pallet at a store.
Figure 18:
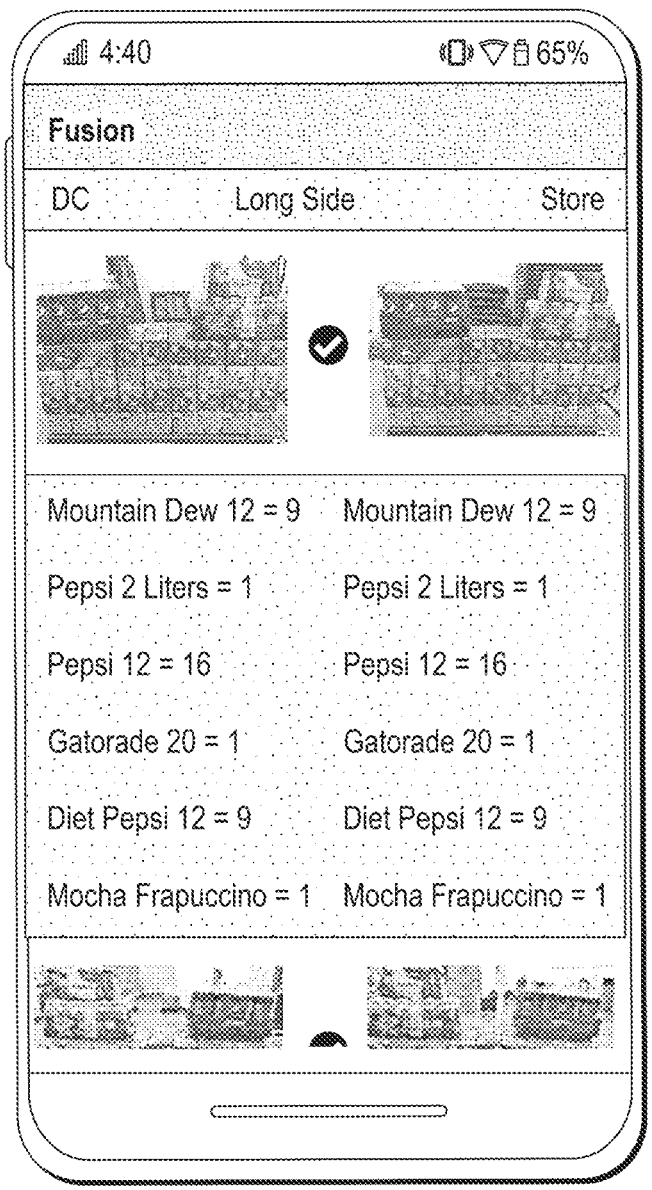
FIG. 18 shows an example screen of a mobile app showing confirmation that the SKUs on the loaded pallet at the store match the pick sheet.
Figure 19:
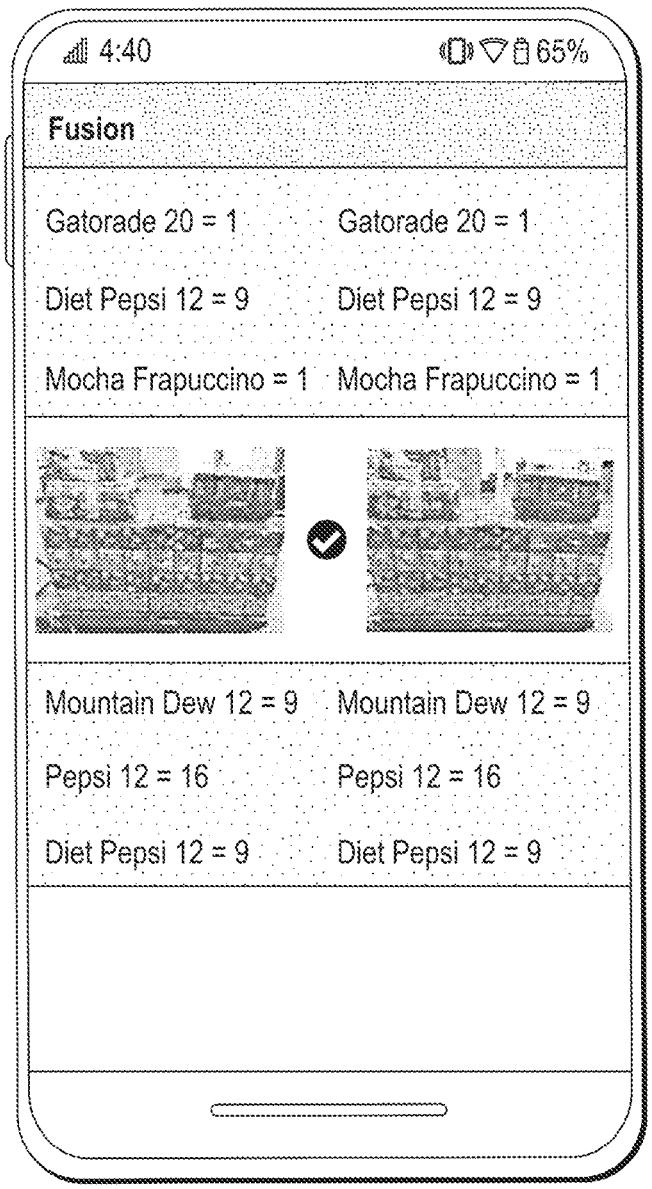
FIG. 19 shows another example screen of a mobile app showing confirmation that the SKUs on the loaded pallet at the store match the pick sheet.

In the first method, the driver removes the wrapping from the loaded pallets 22 and uses the mobile device 50 in the store 16 to take at least one, and preferably several still images or video of the loaded pallet 22 (FIG. 1; FIG. 17; FIG. 25B, step 174). Optionally, the driver may be able to take a single image of a corner of the unwrapped loaded pallet 22, so that two sides of the loaded pallet 22 are captured in a single image. The image(s) 62 are sent from the mobile device 50 to the server 14 (or alternatively the DC computer 26). In step 176, the distribution central server 14 analyzes the images in one of the several ways described above to confirm the presence of the correct number of items 20 of each of the SKUs associated with the pallet id of that pallet 22 on the pick sheet 64 (step 178), and then communicates a confirmation to the driver's mobile device 50 and/or the store employee's mobile device 52, which is displayed on the screens. (FIGS. 18 and 19).

If a discrepancy is detected (step 180), the system indicates the specific discrepancy and how to remedy the discrepancy to the driver in step 182. The driver can correct the discrepancy by retrieving products 20 of the missing SKUs from the truck 18 or crediting the missing SKUs to the store account 42 (step 184). Any SKUs detected that do not belong on the pallets 22 can be returned by the driver to the truck 18. On the store worker's mobile device 52 (via an app), the store worker confirms the presence of the loaded pallet 22 and receives a list of SKUs associated with that pallet id from the distribution center computer 26 or the server 14.

Figure 20:
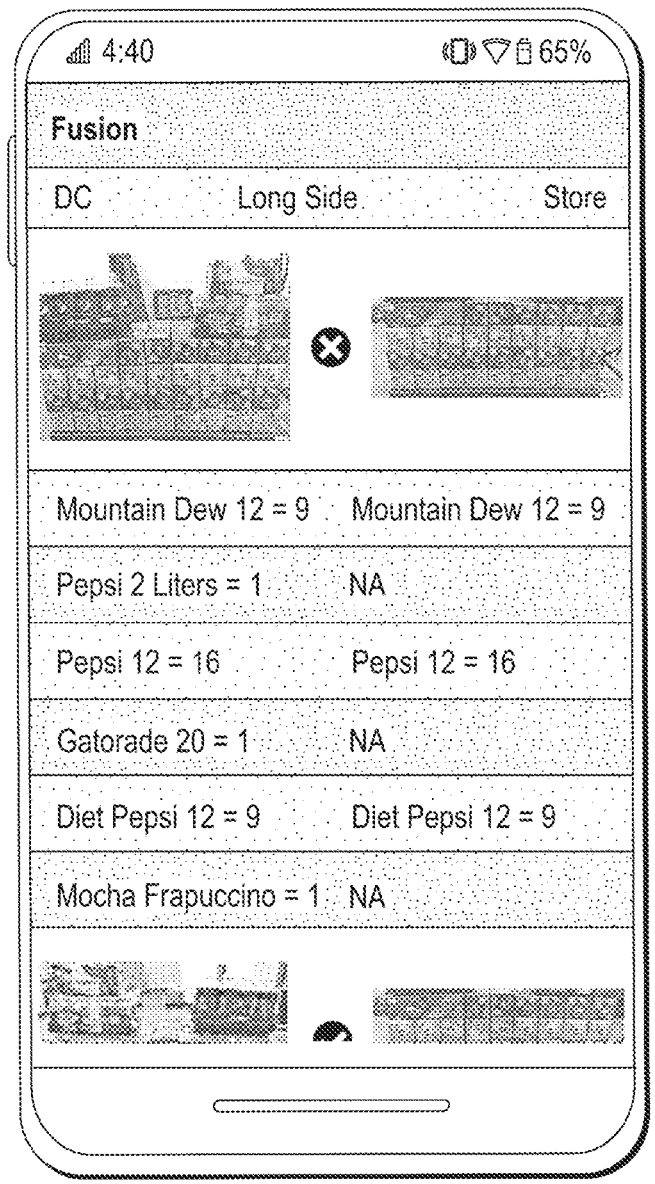
FIG. 20 shows an example screen of a mobile app indicating that the SKUs on the loaded pallet at the store do not match the pick sheet.

If one or more SKUs do not match, the driver is shown the screen of FIG. 20 which indicates specifically what is missing (step 182). Optionally, not shown, the screen on his mobile device may also visually indicate on the image the SKUs that do not match, such as by drawing boxes or circles around the SKUs in the image. If necessary, he can manually identify them by clicking on them and then assigning the right SKU to it. If a SKU was actually physically missing or was legitimately not on the pick list it would also be identified here and the driver could potentially correct the order, such as by retrieving the missing items from the truck 18 in step 184. The driver then completes the delivery in step 186.

Figure 12:
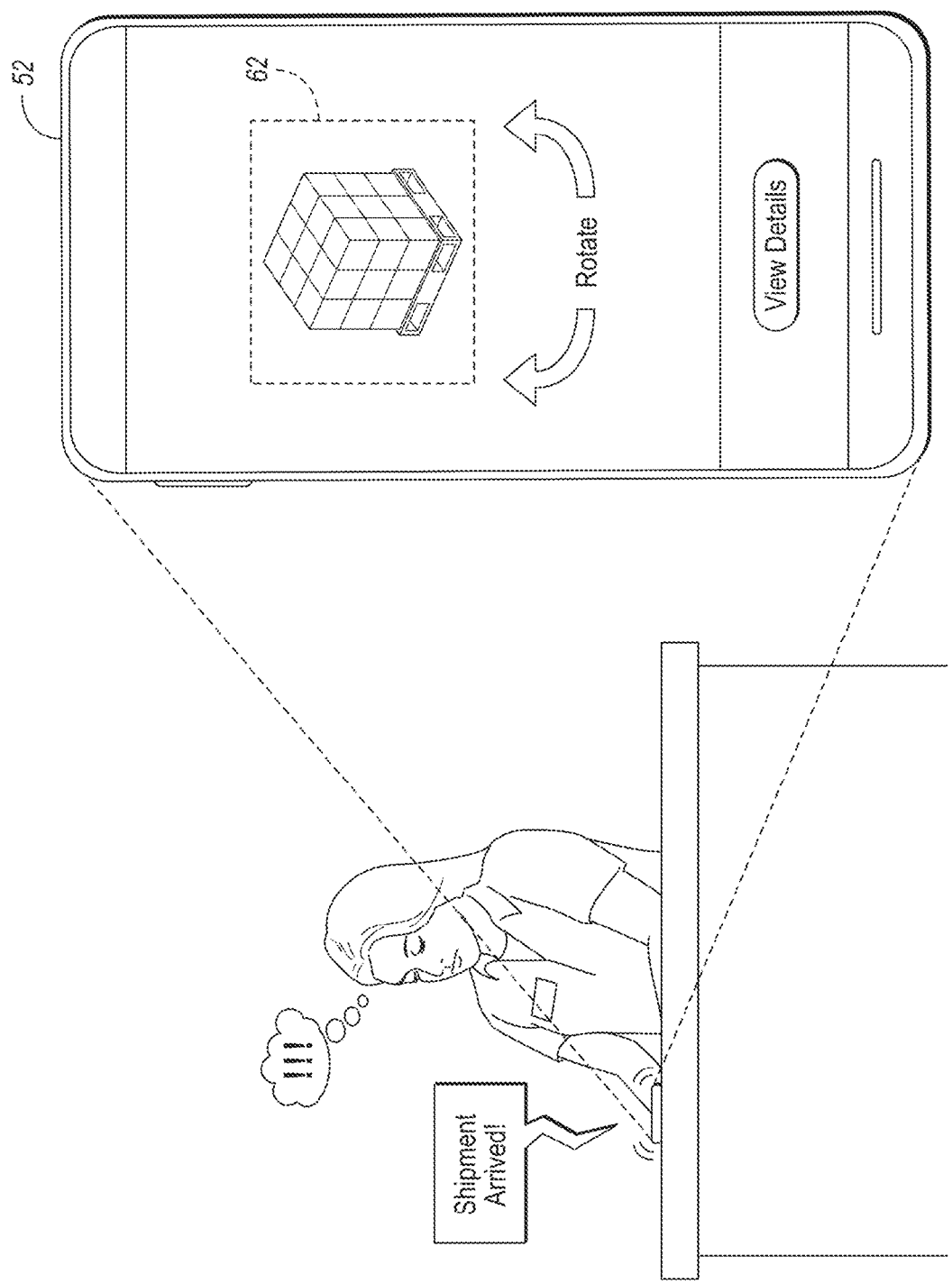
FIG. 12 illustrates a store notification feature of the delivery system of FIG. 1.

Referring to FIG. 12, the store employee may receive a notification via their mobile device 52 that the delivery has been made. Via their mobile device 52, the employee may view the image(s) of the loaded pallets 22 and may be asked to sign off on the delivery based upon the image(s) and/or based upon an indication from the server 14 that the system 10 has confirmed the accuracy of the delivery (i.e. after validation of the in-store image(s)).

In the second method, the driver images the loaded pallets 22 (again, one or more still images or video of each loaded pallet 22) before unwrapping them. The images 62 are sent from the mobile device 50 to the distribution center computer 26 or server 14. The distribution center computer 26 or central server 14 analyzes the images by identifying the SKUs through the stretch wrapping, which is translucent. Alternatively, rather than a full, fresh identification of the SKUs on the loaded pallet 22, all that is needed is a confirmation that nothing on the previously-validated loaded pallet 22 has been changed. For example, knowing the previous arrangement of each SKU on the pallets 22 and the specific packaging of each SKU (for SKUs that may have more than one possible package), it is easier to identify that those SKUs are still in the same location and arrangement as they were when validated at the DC 12.

Additionally, if images of the loaded pallets 22 were also taken after wrapping, the DC computer 26 and/or server 14 can also verify that the wrapping is relatively undisturbed. Alternatively, determining that the wrapping is undisturbed may be done without identifying the SKUs beneath, and if the wrapping is too disturbed, then the driver is notified to remove the wrapping and to image the loaded pallets 22 unwrapped for a full image analysis. Again, the store worker confirms the presence of the loaded pallet 22 and receives a list of SKUs associated with that pallet id from the distribution center computer 26 or the server 14.

Alternatively, the image(s) can simply be compared as an image to the image(s) taken at the distribution center, without actually identifying the skus in the image(s). If the image(s) at the store are similar enough to the image(s) taken at validation, the accuracy of the delivery can be confirmed. This can be done by comparing the unwrapped images to one another or by comparing the wrapped images to one another. However, this would not enable the driver to correct the missing skus as easily. Therefore, if it is determined that the images are not similar enough to the validation images, then a new SKU identification based upon images of the unwrapped loaded pallet 22 at the store 16 could be initiated at that time.

In a third method, the store worker has gained trust in the overall system 10 and simply confirms that the loaded pallet 22 has been delivered to the store 16, without taking the time to go SKU by SKU and compare each to the list that he ordered and without any revalidation/imaging by the driver. In that way, the driver can immediately begin unloading the products 20 from the pallet 22 and placing them on shelves 54 or in coolers 56, as appropriate. This greatly reduces the time of delivery for the driver.

Figure 22:
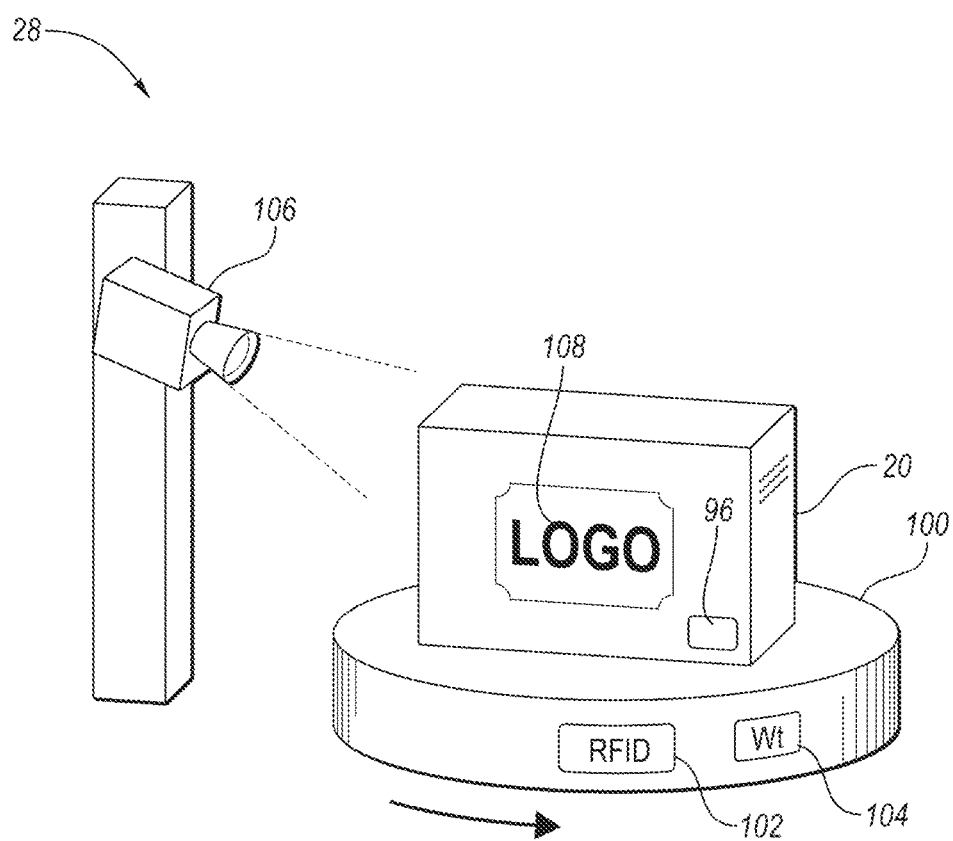
FIG. 22 shows an example training station of the delivery system of FIG. 1.

FIG. 22 shows a sample training station 28 including a turntable 100 onto which a new product 20 (e.g. for a new SKU or new variation of an existing SKU) can be placed to create the SKU file 44. The turntable 100 may include an RFID reader 102 for reading an RFID tag 96 (if present) on the product 20 and a weight sensor 104 for determining the weight of the product 20. A camera 106 takes a plurality of still images and/or video of the packaging of the product 20, including any logos 108 or any other indicia on the packaging, as the product 20 is rotated on the turntable 100. Preferably all sides of the packaging are imaged. The images, weight, RFID information are sent to the server 14 to be stored in the SKU file 44. Optionally, multiple images of the product 20 are taken at different angles and/or with different lighting. Alternatively, or additionally, the computer files with the artwork for the packaging for the product 20 (i.e. files from which the packaging is made) are sent directly to the server 14.

Figure 23:
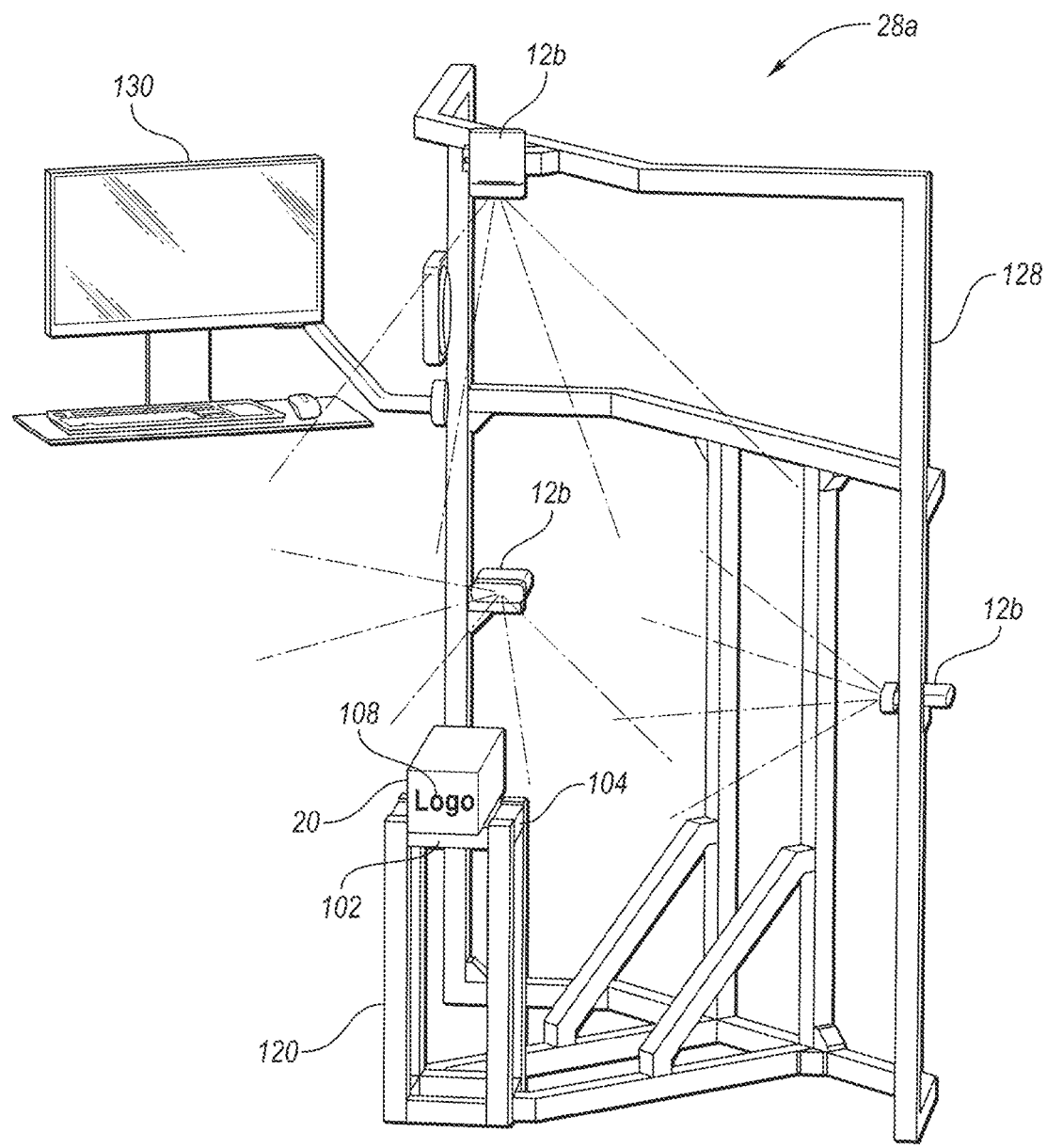
FIG. 23 shows an alternate training station that could be used in the system of FIG. 1.

FIG. 23 shows an alternate training station 28a that could be used in the system of FIG. 1. The training station 28a includes a support stand 120 onto which a new product 20 (e.g. for a new SKU or new variation of an existing SKU) can be placed to create the SKU file 44. The support stand 120 may include an RFID reader 102 for reading an RFID tag 96 (if present) on the product 20 and an optional weight sensor 104 for determining the weight of the product 20. One or more cameras 126 take a plurality of still images and/or video of the packaging of the product 20, including any logos 108 or any other indicia on the packaging. In the example shown, three cameras 126 are mounted to a frame 128 that is secured to the support stand 120. Preferably all sides of the packaging are imaged. Therefore, in the example shown, after capturing three sides with the three cameras 126, a user may rotate the product 20 so that the remaining three sides can be captured. The images, weight, RFID information may be received by a local training computer 130 and sent to the server 14 to be stored in the SKU file 44. Again, optionally, multiple sets of images may be taken with different lighting.

Each of the cameras 106 or 126 can be a depth camera, i.e. it also provides distance information correlated to the image (e.g. pixel-by-pixel distance information or distance information for regions of pixels). Depth cameras are known and utilize various technologies such as stereo vision (i.e. two cameras) or more than two cameras, time-of-flight, or lasers, etc. If a depth camera is used, then the edges of the product 20 are easily detected.

Figure 24:
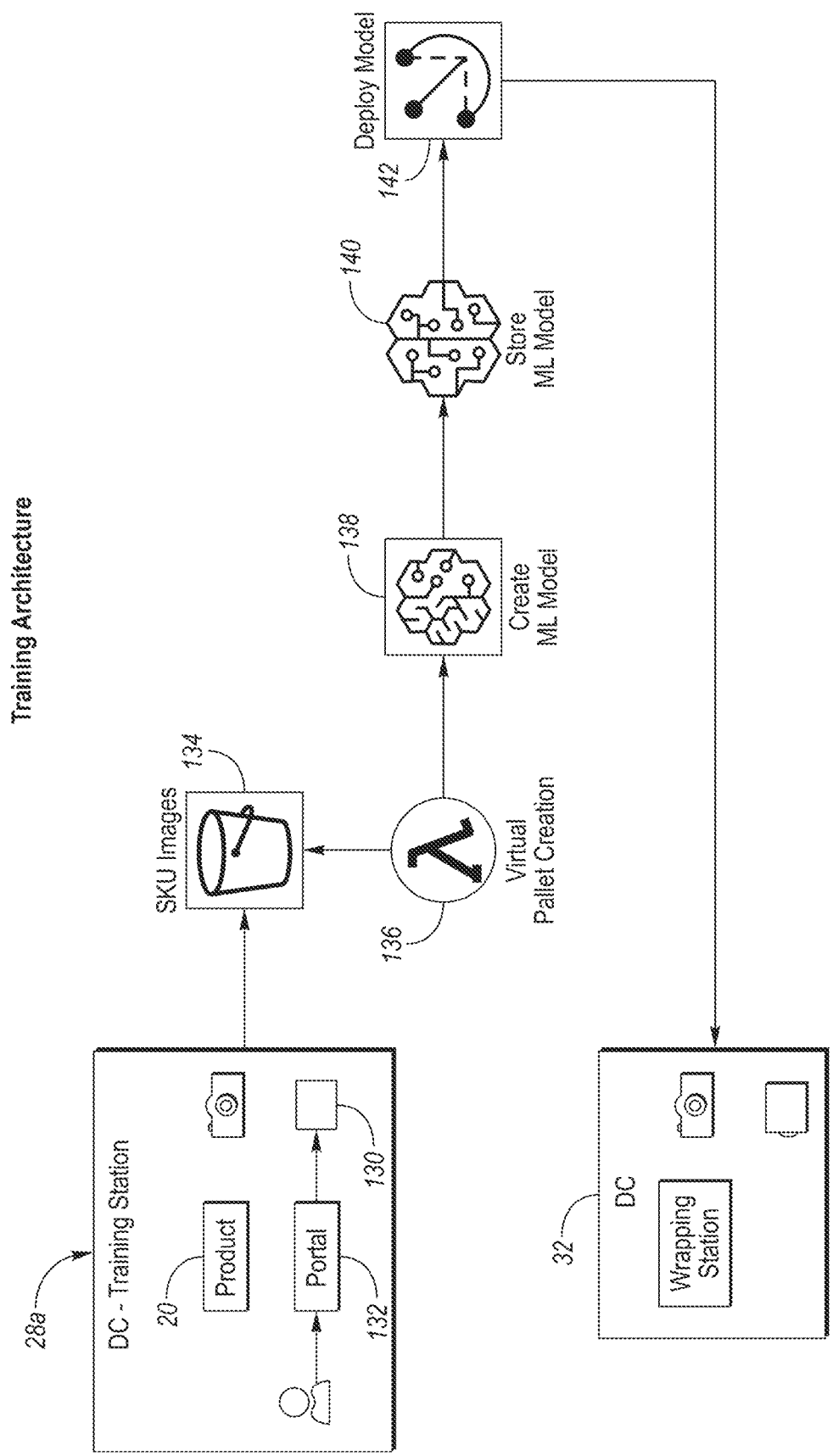
FIG. 24 shows one possible architecture of the training feature of the system of FIG. 1.

In one possible implementation of either training station 28 or 28a, shown in FIG. 24, cropped images of products 20 from the training station 28 are sent from the local computer 130 via a portal 132 to sku image storage 134, which may be at the server 14. Alternatively, the computer files with the artwork for the packaging for the product 20 (i.e. files from which the packaging is made) are sent directly to the server 14.

Figure 26:
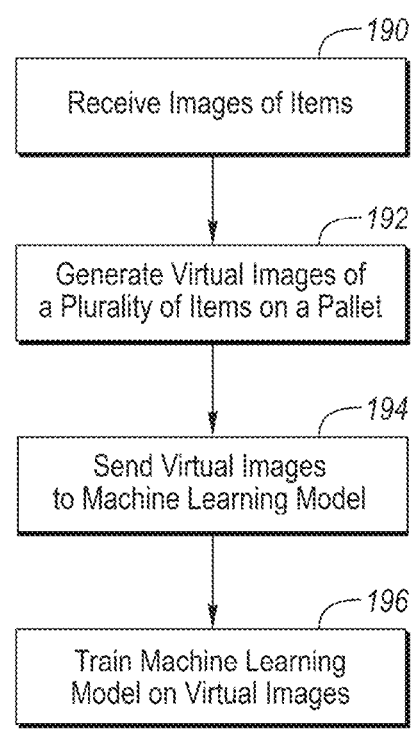
FIG. 26 is a flowchart of one version of a method for training a machine learning model.

Whichever method is used to obtain the images of the items, the images of the items are received in step 190 of FIG. 26. In step 192, an API 136 takes the sku images and builds them into a plurality of virtual pallets, each of which shows how the products 20 would look on a pallet 22. The virtual pallets may include four or five layers of the product 20 on the pallet 22. Some of the virtual pallets may be made up solely of the single new product 20, and some of the virtual pallets will have a mixture of images of different products 20 on the pallet 22. The API 136 also automatically tags the locations and/or boundaries of the products 20 on the virtual pallet with the associated skus. The API creates multiple configurations of the virtual pallet to send to a machine learning model 138 in step 194 to update it with the new skus and pics.

The virtual pallets are built based upon a set of configurable rules, including, the dimensions of the pallet 22, the dimensions of the products 20, number of permitted layers (such as four, but it could be five or six), layer restrictions regarding which products can be on which layers (e.g. certain bottles can only be on the top layer), etc. The image of each virtual pallet is sized to be a constant size (or at least within a particular range) and placed on a virtual background, such as a warehouse scene. There may be a plurality of available virtual backgrounds from which to randomly select.

The virtual pallet images are sent to the machine learning model 138 along with the bounding boxes indicating the boundaries of each product on the image and the SKU associated with each product. The virtual pallet images along with the bounding boxes and associated SKUs constitute the training data for the machine learning model.

In step 196, the machine learning model 138 analyzes the images of the virtual pallets based upon the location, boundary, and sku tag information. The machine learning model 140 is updated and stored. The machine learning model 142 is deployed and used in conjunction with the validation stations 32 (FIG. 1) and optionally with the delivery methods described above. The machine learning model 138 may also receive actual images taken in the distribution center or the stores, which after identification can be added to the machine learning model. Optionally, feedback from the workers can factor into whether the images are used, e.g. the identified images are not used until a user has had an opportunity to verify or contradict the identification.

Figure 27:
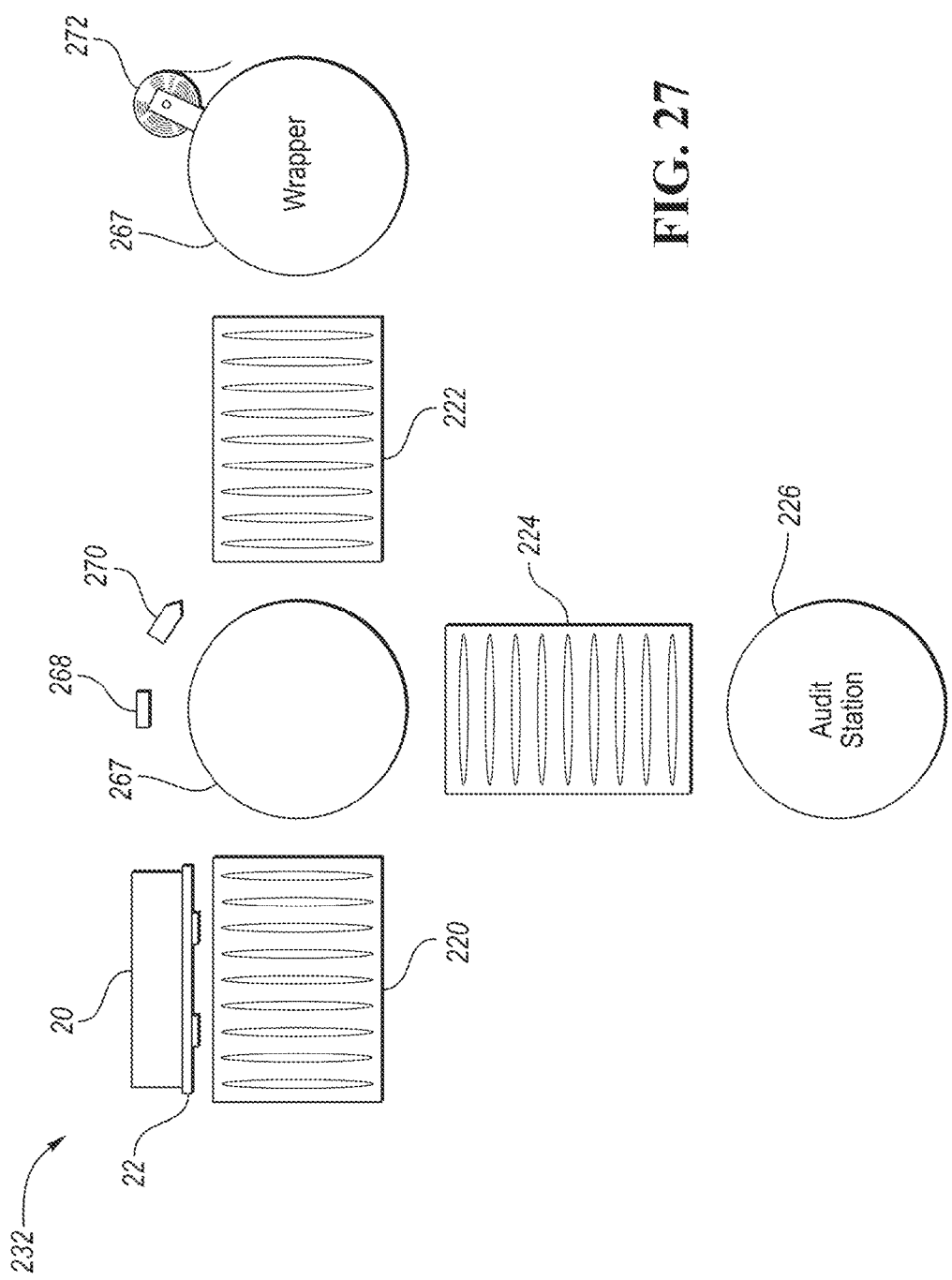
FIG. 27 shows an alternate validation station.

FIG. 27 shows another alternative validation station. A pallet 22 loaded with goods 20 is carried on a first conveyor 220 to a turntable 267. An rfid reader 270 and at least one depth camera 268 are positioned adjacent the turntable 267. When the loaded pallet 22 reaches the turntable 267, the rfid reader 270 identifies the pallet 22 and the loaded pallet 22 is rotated on the turntable 267 so that the camera 268 can take images or video (as before), such as one still image of each of the four sides of the loaded pallet 22. As before, the images are used to identify all of the SKUs on the pallet 22, which are compared to the pick list associated with that pallet 22. If the loaded pallet 22 is validated against the pick list, then the loaded pallet 22 is moved to the second conveyor 222, which carries the loaded pallet 22 to a dedicated wrapping station, with a turntable 267 and stretch wrap 272. The loaded pallet 22 is wrapped with the stretch wrap at the wrapping station. If the loaded pallet 22 is not validated against the pick list, the loaded pallet 22 is moved on a third conveyor 224 to an audit station 226, where a worker can make the corrections to the goods 20 on the pallet 22 in the manner explained above in the other embodiments.

In accordance with the provisions of the patent statutes and jurisprudence, exemplary configurations described above are considered to represent preferred embodiments of the inventions. However, it should be noted that the inventions can be practiced otherwise than as specifically illustrated and described without departing from its spirit or scope. Alphanumeric identifiers on method steps are solely for ease in reference in dependent claims and such identifiers by themselves do not signify a required sequence of performance, unless otherwise explicitly specified.

What is claimed is:

1. A pallet sled comprising:
an upper support surface for supporting at least one pallet thereon;
a handle extending upward adjacent an end of the upper support surface;
an rfid reader configured to read at least one rfid tag of the at least one pallet supported on the upper support surface; and
a mobile device configured to determine a current location of the mobile device, the mobile device further configured to determine whether the at least one pallet identified by the rfid reader should be delivered to a store at the current location.

2. The pallet sled of claim 1 further including a camera mounted to the handle and configured to image items supported on the at least one pallet on the upper support surface.

3. The pallet sled of claim 1 wherein the rfid reader is configured to read rfid tags of items on the at least one pallet.

4. The pallet sled of claim 1 further including the at least one pallet supported on the upper support surface, the at least one pallet including the at least one rfid tag secured thereto.

5. The pallet sled of claim 1 wherein the pallet sled is configured to count pallets delivered to the store and to count pallets returned from the store.

6. The pallet sled of claim 1 wherein the mobile device is a smartphone or tablet.

7. The pallet sled of claim 1 wherein the rfid reader is configured to read rfid tags secured to returnable packaging supported on the at least one pallet.

8. The pallet sled of claim 7 wherein the mobile device includes a gps receiver indicating the current location.

9. The pallet sled of claim 8 wherein the mobile device is a smartphone or tablet.

10. The pallet sled of claim 1 wherein the rfid reader is configured to determine a pallet id associated with the at least one rfid tag, wherein the pallet sled is configured to send the pallet id to the mobile device, wherein the mobile device is configured to determine whether the at least one pallet associated with the pallet id should be delivered to the store at the current location.

11. The pallet sled of claim 10 wherein the mobile device is configured to indicate to a user whether the at least one pallet identified by the rfid reader should be delivered to the store at the current location.

12. The pallet sled of claim 11 wherein the pallet sled is configured to count crates delivered to the store and to count crates from the store.

13. A pallet sled comprising:
an upper support surface for supporting a pallet thereon;
wheels supporting the upper support surface;
a handle extending upward adjacent an end of the upper support surface;
an rfid reader configured to read an rfid tag of the pallet supported on the upper support surface; and
a camera mounted to the handle and configured to image items supported on the pallet on the upper support surface.

14. The pallet sled of claim 13 further including the pallet supported on the upper support surface, the pallet including the rfid tag secured thereto.

15. The pallet sled of claim 13 wherein the rfid reader is configured to read rfid tags secured to returnable packaging supported on the pallet.

16. The pallet sled of claim 13 further including a mobile device, wherein the rfid reader is configured to determine a pallet id associated with the rfid tag, wherein the pallet sled is configured to send the pallet id to the mobile device, wherein the mobile device is configured to determine whether the pallet associated with the pallet id should be delivered to a store at a current location.

17. The pallet sled of claim 16 wherein the mobile device is a smartphone or tablet.

* * * * *